US012614040B2

(12) United States Patent
Wang et al.

(10) Patent No.: US 12,614,040 B2
(45) Date of Patent: Apr. 28, 2026

(54) SIMULTANEOUS TRANSLATION DEVICE AND COMPUTER PROGRAM

(71) Applicant: National Institute of Information and Communications Technology, Tokyo (JP)

(72) Inventors: Xiaolin Wang, Tokyo (JP); Masao Uchiyama, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 253 days.

(21) Appl. No.: 18/264,595

(22) PCT Filed: Dec. 27, 2021

(86) PCT No.: PCT/JP2021/048527
§ 371 (c)(1),
(2) Date: Aug. 8, 2023

(87) PCT Pub. No.: WO2022/181040
PCT Pub. Date: Sep. 1, 2022

(65) Prior Publication Data
US 2024/0111967 A1      Apr. 4, 2024

(30) Foreign Application Priority Data

Feb. 24, 2021      (JP) ................................. 2021-027112

(51) Int. Cl.
*G06F 40/44*          (2020.01)
*G06F 40/289*        (2020.01)

(52) U.S. Cl.
CPC ............ *G06F 40/44* (2020.01); *G06F 40/289* (2020.01)

(58) Field of Classification Search
CPC ......... G06F 40/44; G06F 40/289; G06F 40/58
See application file for complete search history.

(56) References Cited

U.S. PATENT DOCUMENTS 8,719,003 B1 *   5/2014   Chen ...................... G06F 40/45
                                                         704/7
2014/0172413 A1 *   6/2014   Cvijetic ................ G06F 40/263
                                                         704/9
(Continued)

FOREIGN PATENT DOCUMENTS

JP          61-175858 A        8/1986
JP          2016-071761 A      5/2016
JP          2017-199363 A      11/2017

OTHER PUBLICATIONS

Xiaolin Wang, Masao Utiyama and Eiichiro Sumita. (2019) Online Sentence Segmentation for Simultaneous Interpretation using Multi-Shifted Recurrent Neural Network. MT Summit. (cited in specification).
(Continued)

*Primary Examiner* — Athar N Pasha
(74) *Attorney, Agent, or Firm* — Renner, Otto, Boisselle & Sklar, LLP

(57)          ABSTRACT

A simultaneous translation system includes: an encoder encoding an input word sequence to an intermediate language representation; a chunk-end detecting device detecting an end of a chunk in the word sequence; a word vector reading unit inputting a partial word sequence up to the chunk-end detected by the chunk-end detecting device to the encoder; a decoder and a translated word searching unit receiving the intermediate language representation from encoder as an input, for outputting a translation word sequence corresponding to the partial word sequence; and a translated word sequence storage unit storing the translation word sequences output by decoder and translated word searching unit.

5 Claims, 11 Drawing Sheets

(56) References Cited

U.S. PATENT DOCUMENTS

| | | | | |
|---|---|---|---|---|
| 2016/0092438 | A1 | 3/2016 | Sonoo | |
| 2017/0308526 | A1* | 10/2017 | Uchiyama | G06F 40/211 |
| 2019/0266249 | A1* | 8/2019 | Xu | G06F 40/103 |
| 2022/0092274 | A1* | 3/2022 | Arivazhagan | G06F 40/47 |
| 2022/0277138 | A1* | 9/2022 | Yamada | G06N 20/00 |
| 2023/0141191 | A1* | 5/2023 | Matsuoka | G06F 40/284 |
| | | | | 382/177 |

OTHER PUBLICATIONS

Ashish Vaswani, Noam Shazeer, Niki Parmar, Jakob Uszkoreit, Llion Jones, Aidan N Gomez, Lukasz Kaier, and Illia Polosukhin. 2017. Attention is all you need. In I. Guyon, U. V. Luxburg, S. Bengio, H. Wallach, R. Fergus, S. Vishwanathan, and R. Garnett, editors, Advances in Neural Information Processing Systems 30, pp. 5998-6008. Curran Associates, Inc. (cited in specification).

Jiatao Gu, Graham Neubig, Kyunghyun Cho, Victor O. K. Li (2016) Learning to Translate in Real-time with Neural Machine Translation. https://arxiv.org/abs/1610.00388 (cited in specification).

Mingbo Ma, Liang Huang, Hao Xiong, Renjie Zheng, Kaibo Liu, Baigong Zheng, Chuanqiang Zhang, Zhongjun He, Hairong Liu, Xing Li, Hua Wu, and Haifeng Wan. STACL: Simultaneous translation with implicit anticipation and controllable latency using prefix-to-prefix framework. In Proceedings of the 57th Annual Meeting of the Association for Computational Linguistics, pp. 3025-3036, Florence, Italy, Jul. 2019. Association for Computational Linguistics. (cited in specification).

Katsuhito Sudoh, Sashi Novitasari, Katsuki Chousa, Tomoya Yanagita, Kosuke Futamata, Sakriani Sakti, and Satoshi Nakamura. NAIST: Simultaneous Speech-to-Speech Translation System based on progressive speech recognition, machine translation, and text-to-speech synthesis. In the Proceedings of the 26th Annual Meeting (online) of the Association for Natural Language Processing, pp. 1015-1018, Mar. 2020. (original in Japanese machine translation).

International Search Report for corresponding Application No. PCT/JP2021/048527, mailed Dec. 27, 2021.

* cited by examiner

Figure 4:
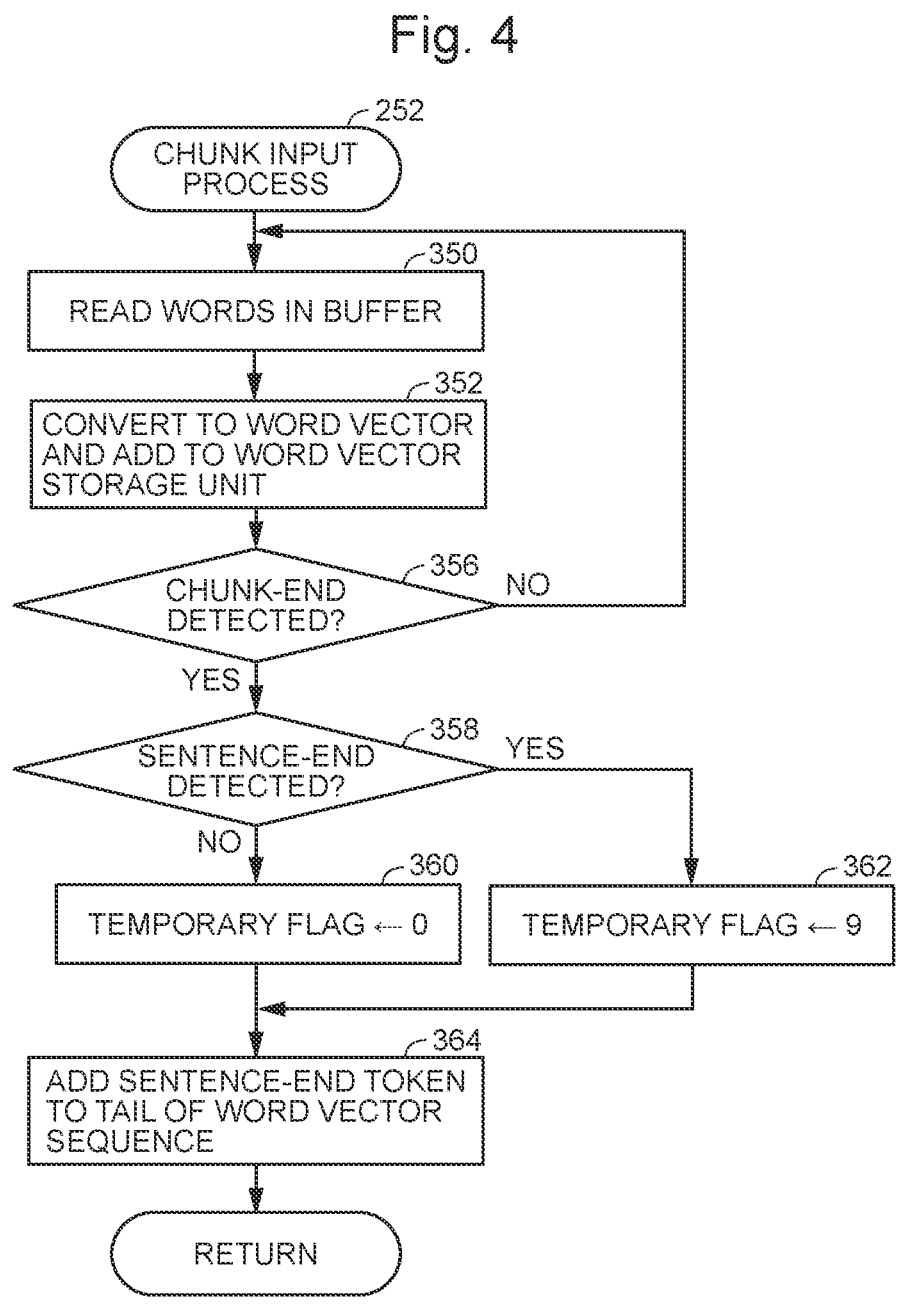

CHUNK INPUT
PROCESS

350

READ WORDS IN BUFFER

352

CONVERT TO WORD VECTOR
AND ADD TO WORD VECTOR
STORAGE UNIT

356

CHUNK-END
DETECTED?    NO

YES

358

SENTENCE-END
DETECTED?    YES

NO

360

TEMPORARY FLAG ← 0

362

TEMPORARY FLAG ← 9

364

ADD SENTENCE-END TOKEN
TO TAIL OF WORD VECTOR
SEQUENCE

RETURN

Fig. 5

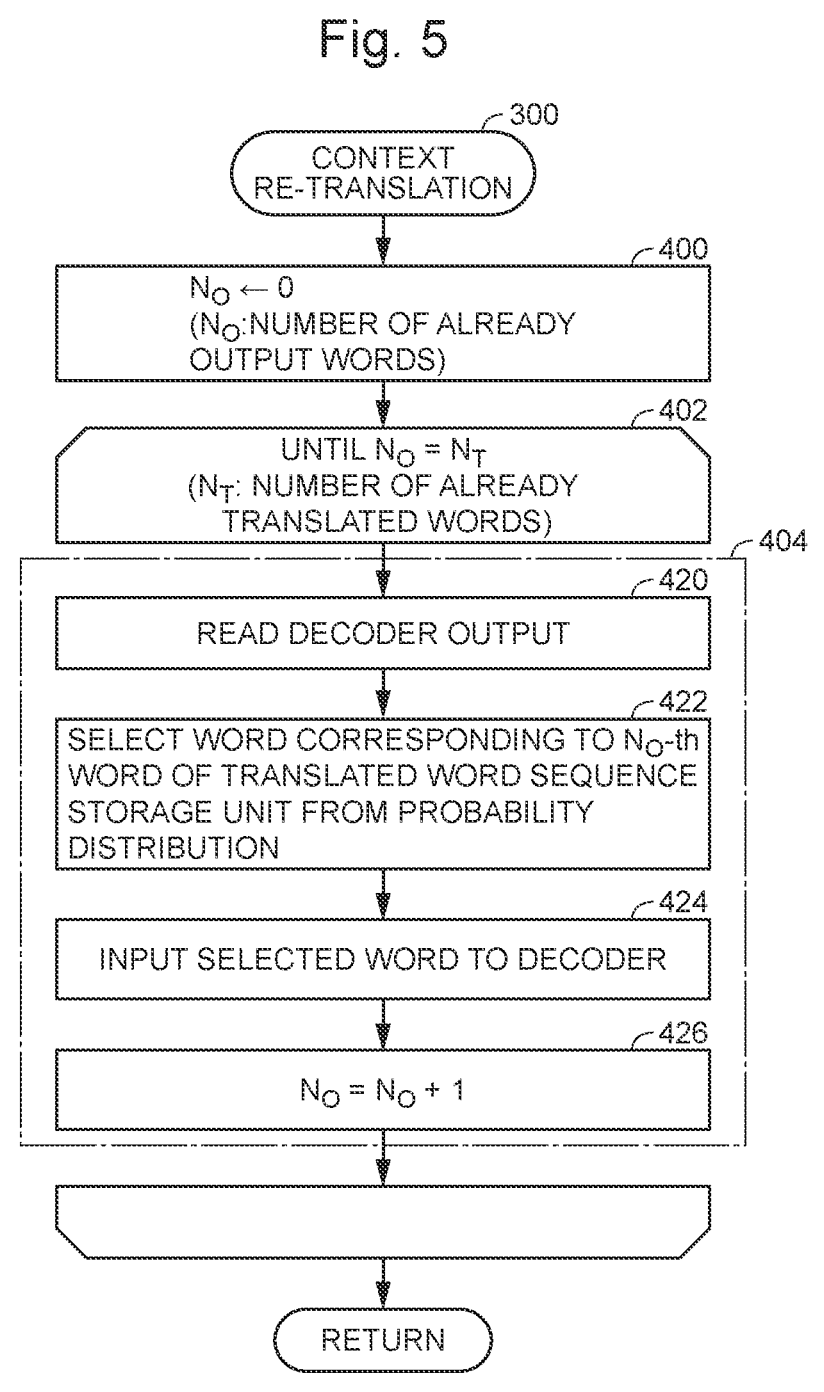

```
                    ┌─ 300
              ╭──────────────╮
              │   CONTEXT    │
              │RE-TRANSLATION│
              ╰──────────────╯
                     │
                     ▼         ┌─ 400
         ┌───────────────────────────┐
         │  N_O ← 0                  │
         │  (N_O:NUMBER OF ALREADY   │
         │  OUTPUT WORDS)            │
         └───────────────────────────┘
                     │
                     ▼         ┌─ 402
        ╱────────────────────────────╲
        │  UNTIL N_O = N_T            │
        │  (N_T: NUMBER OF ALREADY    │
        │  TRANSLATED WORDS)          │
        ╲────────────────────────────╱
                     │           ┌─ 404
         ┌───────────────────────────┐
         │            │       ┌─ 420 │
         │  ┌─────────────────────┐  │
         │  │ READ DECODER OUTPUT │  │
         │  └─────────────────────┘  │
         │            │       ┌─ 422 │
         │  ┌─────────────────────┐  │
         │  │SELECT WORD          │  │
         │  │CORRESPONDING TO     │  │
         │  │N_O-th WORD OF       │  │
         │  │TRANSLATED WORD      │  │
         │  │SEQUENCE STORAGE UNIT│  │
         │  │FROM PROBABILITY     │  │
         │  │DISTRIBUTION         │  │
         │  └─────────────────────┘  │
         │            │       ┌─ 424 │
         │  ┌─────────────────────┐  │
         │  │INPUT SELECTED WORD  │  │
         │  │TO DECODER           │  │
         │  └─────────────────────┘  │
         │            │       ┌─ 426 │
         │  ┌─────────────────────┐  │
         │  │ N_O = N_O + 1       │  │
         │  └─────────────────────┘  │
         └───────────────────────────┘
                     │
                     ▼
        ╱────────────────────────────╲
        ╲────────────────────────────╱
                     │
                     ▼
              ╭──────────────╮
              │    RETURN    │
              ╰──────────────╯
```

$N_O \leftarrow 0$
($N_O$:NUMBER OF ALREADY OUTPUT WORDS)

UNTIL $N_O = N_T$
($N_T$: NUMBER OF ALREADY TRANSLATED WORDS)

READ DECODER OUTPUT

SELECT WORD CORRESPONDING TO $N_O$-th WORD OF TRANSLATED WORD SEQUENCE STORAGE UNIT FROM PROBABILITY DISTRIBUTION

INPUT SELECTED WORD TO DECODER $N_O = N_O + 1$

Fig. 6

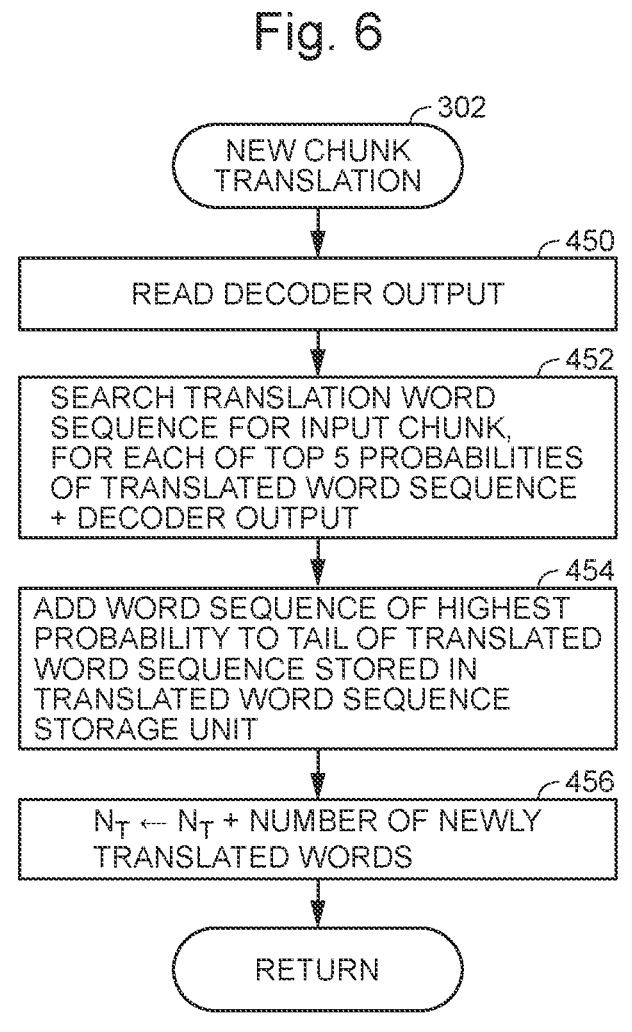

```
                            ╭─────302
                    ╭──────────────────╮
                    │   NEW CHUNK      │
                    │   TRANSLATION    │
                    ╰──────────────────╯
                            │
                            ▼           ╭─450
        ┌───────────────────────────────────┐
        │        READ DECODER OUTPUT        │
        └───────────────────────────────────┘
                            │
                            ▼           ╭─452
        ┌───────────────────────────────────┐
        │ SEARCH TRANSLATION WORD           │
        │ SEQUENCE FOR INPUT CHUNK,         │
        │ FOR EACH OF TOP 5 PROBABILITIES   │
        │ OF TRANSLATED WORD SEQUENCE       │
        │ + DECODER OUTPUT                  │
        └───────────────────────────────────┘
                            │
                            ▼           ╭─454
        ┌───────────────────────────────────┐
        │ ADD WORD SEQUENCE OF HIGHEST      │
        │ PROBABILITY TO TAIL OF TRANSLATED │
        │ WORD SEQUENCE STORED IN           │
        │ TRANSLATED WORD SEQUENCE          │
        │ STORAGE UNIT                      │
        └───────────────────────────────────┘
                            │
                            ▼           ╭─456
        ┌───────────────────────────────────┐
        │ N_T ← N_T + NUMBER OF NEWLY       │
        │ TRANSLATED WORDS                  │
        └───────────────────────────────────┘
                            │
                            ▼
                    ╭──────────────────╮
                    │     RETURN       │
                    ╰──────────────────╯
```

Step 456: $N_T \leftarrow N_T + $ NUMBER OF NEWLY TRANSLATED WORDS

SIMULTANEOUS TRANSLATION DEVICE AND COMPUTER PROGRAM

CROSS-REFERENCE TO RELATED APPLICATIONS

This application is a national phase of International Application No. PCT/JP2021/048527 filed Dec. 27, 2021, which claims priority to Japanese Patent Application No. 2021-027112 filed Feb. 24, 2021, in the Japan Patent Office, both of which are hereby incorporated herein by reference in their entirety.

TECHNICAL FIELD

The present invention relates to a machine-translation device and, more specifically, to a simultaneous translation device.

BACKGROUND ART

Machine translation devices come to be widely used. A machine translation device using a neural network described in Non-Patent Literature 2 listed below (a so-called "neural machine translation") realizes translation of far higher accuracy of considerably long sentences as compared with conventional techniques.

In the field of so-called simultaneous translation, however, use of machine translation device is limited. For simultaneous translation, a voice recognition device exists to provide an input. Outputs from the voice recognition device do not include so-called punctuations. Therefore, a neural machine translation, which fundamentally provides sentence-by-sentence translation, cannot translate directly the outputs of a voice recognition device as they are.

A technique disclosed in Non-Patent Literature 1 listed below proposes a solution to this problem. The technique disclosed in Non-Patent Literature 1 detects an end-of-sentence from a sequence of words not including any punctuation. This technique also utilizes a neural network. If the outputs of a voice recognition device are divided sentence by sentence using this technique, it becomes possible for the neural machine translation to translate the outputs of the voice recognition device using a sentence as a unit.

In the case of simultaneous translation, the question arises that the translation would lag behind the topic if it is done sentence by sentence. Therefore, there is a demand for simultaneous translation device that is capable of translation substantially on a real-time basis by using a unit shorter than a sentence.

CITATION LIST

Patent Literature

PTL 1: JP 2017-199363 A

Non-Patent Literature

NPL 1: Xiaolin Wang, Masao Utiyama and Eiichiro Sumita. (2019) Online Sentence Segmentation for Simultaneous Interpretation using Multi-Shifted Recurrent Neural Network. MT Summit.
NPL 2: Ashish Vaswani, Noam Shazeer, Niki Parmar, Jakob Uszkoreit, Llion Jones, Aidan N Gomez, Lukasz Kaier, and Illia Polosukhin. 2017. Attention is all you need. In I. Guyon, U. V. Luxburg, S. Bengio, H. Wallach, R. Fergus, S. Vishwanathan, and R. Garnett, editors, Advances in Neural Information Processing Systems 30, pages 5998-6008. Curran Associates, Inc.
NPL 3: Jiatao Gu, Graham Neubig, Kyunghyun Cho, Victor O. K. Li (2016) Learning to Translate in Real-time with Neural Machine Translation. https://arxiv.org/abs/1610.00388
NPL 4: Mingbo Ma, Liang Huang, Hao Xiong, Renjie Zheng, Kaibo Liu, Baigong Zheng, Chuanqiang Zhang, Zhongjun He, Hairong Liu, Xing Li, Hua Wu, and Haifeng Wan. STACL: Simultaneous translation with implicit anticipation and controllable latency using prefix-to-prefix framework. In Proceedings of the 57th Annual Meeting of the Association for Computational Linguistics, pages 3025-3036, Florence, Italy, July 2019. Association for Computational Linguistics.

SUMMARY OF INVENTION

Technical Problem

Non-Patent Literatures 3 and 4 propose solutions to the above-described problem. These references propose using machine translation engines in which the mechanism of neural machine translation itself is modified. These modified machine translation engines divide an input word sequence to units (referred to as chunks) smaller than a sentence and perform chunk-by-chunk translation. The chunk-by-chunk machine translation may possibly avoid at least the problem of machine translation too sluggish to follow the topic.

The proposals made in the Non-Patent Literatures, however, are problematic as the performances of modified machine translation engines are not satisfactory. Even if it becomes possible to follow the topic, simultaneous translation fails if the translation accuracy is not high enough.

Therefore, an object of the present invention is to provide a simultaneous translation device capable of highly accurate simultaneous translation of input word sequences, substantially on a real-time basis.

Solution to Problem

According to a first aspect, the present invention provides a simultaneous translation device, including: an encoder for encoding an input word sequence to an intermediate language representation; a chunk-end detecting means for detecting an end of a chunk in the word sequence on a real-time basis; a word sequence input means for inputting a partial word sequence to the encoder, the partial word sequence consisting of a part of the input word sequence up to the chunk of which end is detected by the chunk-end detecting means; a decoding means receiving the intermediate language representation output from the encoder as an input for outputting a translation word sequence of a prescribed language corresponding to the partial word sequence; and a translation word sequence storage means for storing the translation word sequence output from the decoding means; wherein the decoding means includes a sequential decoding means receiving the intermediate language representation output from the encoder as an input, by using the translation word sequence stored in the translation word sequence storage means as a determinate and searching for a translation word sequence to follow, for sequentially outputting translation word sequences in a prescribed language corresponding to the partial word sequence.

Preferably, the simultaneous translation device further includes: a sentence-end detecting means for detecting an end of sentence in the input word sequence; a one-sentence translation device, responsive to detection of an end of sentence by the sentence-end detecting means, for outputting a translated sentence in the prescribed language corresponding to the word sequence up to the end of sentence; and a translation sentence replacing means, responsive to the output of translated sentence from the one-sentence translation device, for replacing the output of the decoding means by the translated sentence from the one-sentence translation device.

More preferably, the simultaneous translation device further includes a clearing means, responsive to detection of a chunk-end of the word sequence by the chunk-end detecting means after replacement of the translated sentence by the translation sentence replacing means, for clearing the translation word sequence storage means.

Further preferably, the translation sentence replacing means includes an evaluating means, responsive to an output of the translated sentence from the one-sentence translation device, for evaluating magnitude of difference between the output of the decoding means and the translated sentence from the one-sentence translation device; and a replacing means, responsive to an evaluation by the evaluating means that the magnitude of difference is larger than a threshold value, for replacing the output of the decoding means by the translated sentence from the one-sentence translation device.

Preferably, the simultaneous translation device further includes: a tag adding means for adding a first tag determined by a prescribed condition, to a head of the input word sequence; and a tag inserting means for inserting, when the translation word sequence storage means is cleared, by storing a second tag corresponding to the first tag in the translation word sequence storage means, the second tag at the head of the translation word sequence.

According to a second aspect, the present invention provides a computer program causing a computer to function as any of the above-described devices.

The foregoing and other objects, features, aspects and advantages of the present invention will become more apparent from the following detailed description of the present invention when taken in conjunction with the accompanying drawings.

BRIEF DESCRIPTION OF DRAWINGS

FIG. 4 is a flowchart showing a control structure related to details of a chunk input process of the program shown in FIG. 3.

FIG. 5 is a flowchart showing a control structure related to details of a translated chunk re-translation process of the program shown in FIG. 3.

FIG. 6 is a flowchart showing a control structure related to details of a new chunk translation process of the program shown in FIG. 3.

DESCRIPTION OF EMBODIMENTS

Figure 1:
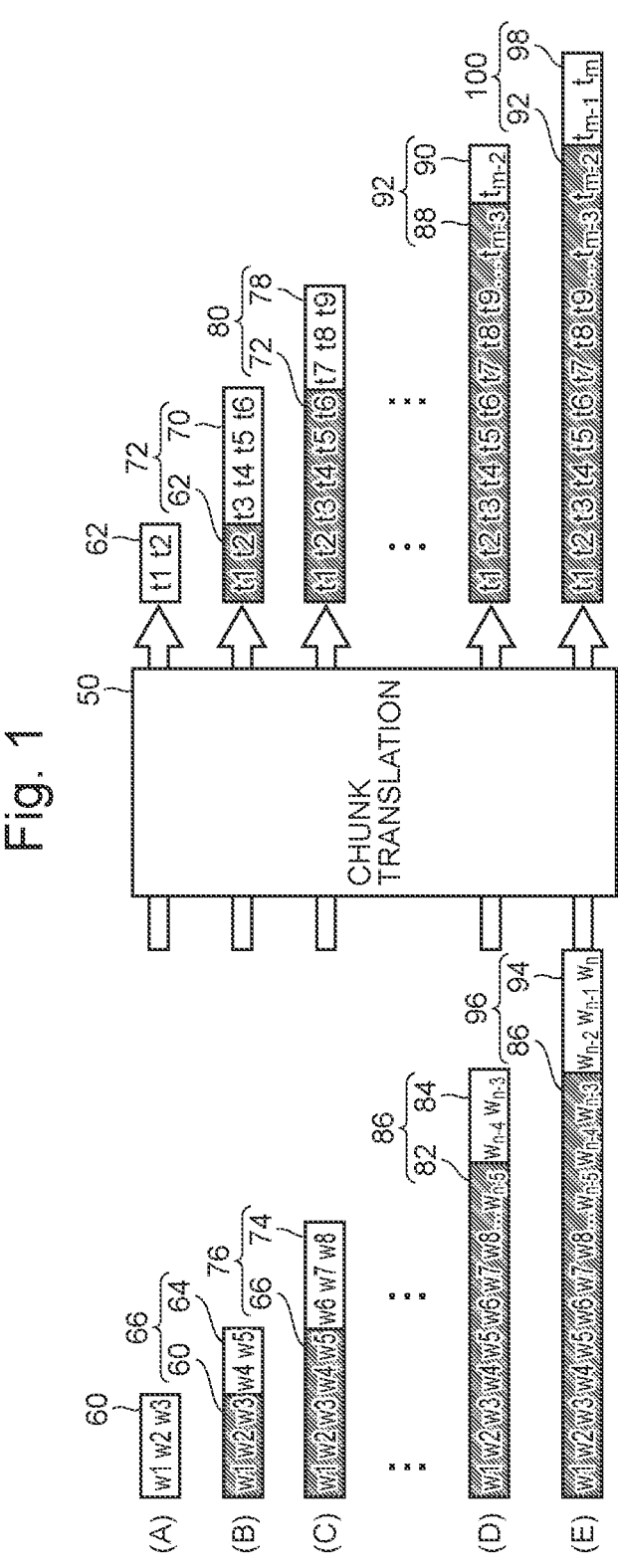
FIG. 1 is an illustration schematically showing a machine translation sequence by the simultaneous translation device in accordance with a first embodiment of the present invention.

In the following descriptions and in the drawings, the same components are denoted by the same reference characters. Therefore, detailed descriptions thereof will not be repeated.

I. First Embodiment

1. Outline of the Translation Method in Accordance with the First Embodiment FIG. 1 is an illustration schematically showing a machine translation sequence by the simultaneous translation device in accordance with the first embodiment. In this embodiment also, it is assumed that there is a voice recognition device in the preceding stage. Therefore, an input to the simultaneous translation device is a word sequence from the voice recognition device, and it does not include any punctuation. In the present embodiment, applying the technique disclosed in Non-Patent Literature 1, one sentence is divided to chunks as smaller units and every time a new chunk is detected, chunk-translation 50 is conducted on a partial word sequence from the head of the input word sequence to that chunk. The chunk-translation has two characteristics.

The first characteristic is that chunk-translation 50 can be realized by substantially transferring directly the translation method of conventional sentence-by-sentence neural machine translation. Starting with the neural machine translation described in Non-Patent Literature 2, so-called end-to-end type neural machine translations including an encoder and a decoder are currently dominant. In these machine translations, the encoder converts an input word sequence to an intermediate language representation and inputs it to the decoder. Based on this input, the decoder calculates as a vector a probability that each translated word becomes the head word of a translated sentence, for all the vocabulary of the translation target language. This vector will be referred to as "probability distribution" here.

Further, based on the probability distribution, the decoder selects some words having high-ranking probabilities as translated word candidates, and by inputting each of these to the decoder again, obtains the next probability distribution. As a result, for the translated word candidates under processing, a plurality of next translated word candidates can be obtained, and probability of each of which can be calculated. By this operation effected on each of the selected translated word candidates, a tree of translated word candidate sequence is formed. By beam search based on probability, a translated word candidate sequence having the highest probability as the translated word sequence for the word sequence forming the input sentence is selected and determined to be the translation of the input sentence.

In the present embodiment, such conventional translation method is almost directly used. The present embodiment, however, is distinguished from the conventional translation method by the second characteristic described in the following.

Chunk translation 50 performs chunk-by-chunk translation. Here, the word sequence as an object of translation is from the head of the input character sequence to the last detected chunk. By way of example, referring to FIG. 1(A), assume that the head of the input word sequence is a chunk 60 that includes words w1, w2 and w3, and therefore, the end (chunk-end) of the chunk is first detected. Chunk 60 is translated by chunk translation 50, and a translation word sequence 62 including words t1 and t2 in translation target language is obtained.

Thereafter, referring to FIG. 1(B), assume that a chunk 64 including words w4 and w5 is input to chunk translation 50 and that its chunk-end is detected. Here, the object of translation is a chunk sequence 66 that includes not only chunk 64 but also chunk 60 of which translation has already been completed. Therefore, it follows that chunk 60 will be again translated for the second time. In the present embodiment, however, the result of second-time translation of chunk 60 is subjected to the above-described search of translated word candidate sequence, assuming that the translation word sequence 62 as the result of first-time translation is a determinate. Specifically, a translated word sequence 72 as a result of translation of chunk sequence 66 includes the translation word sequence 62 as it is, followed by an added translated word sequence 70 (words t3, t4, t5 and t6) resulting from translation of chunk 64. This is the second characteristic of the present embodiment.

This manner of translation continues when a chunk-end of the third chunk 74 is detected. Specifically, referring to FIG. 1(C), assume that a chunk sequence 76 as the next object of translation includes chunk sequence 66 and a chunk 74 following thereto. A translated word sequence 80 output as a result of translation of the chunk sequence 76 by chunk translation 50 is the translated word sequence 72 as the immediately preceding output plus a translated word sequence 78, which is a result of translation of chunk 74.

Referring to FIG. 1(D), assume that this translation continues and a chunk-end of a chunk 84, which is the second last chunk from the end of sentence, is detected. Here, the chunk sequence 86 as the object of translation is the chunk sequence 82 which has just been translated immediately before, plus the chunk sequence 84. The translated word sequence 92 as the result of translation is the translated word sequence 88 as the result of translation of immediately preceding chunk sequence 82 plus the translated word sequence 90 as the result of translation of chunk 84.

Referring to FIG. 1(E), assume that the chunk 94 at the end of the sentence is detected. The chunk sequence 96 as the object of translation is chunk sequence 86 plus chunk 94. The translated word sequence 100 as the result of translation is the translated word sequence 92 as the immediately preceding translation result plus translated word sequence 98 as the result of translation of chunk 94. The translated word sequence 100 will be output as the translated sentence of the input word sequence.

As described above, in the present embodiment, the object of translation when a chunk-end of a chunk is detected is from the head of the input word sequence to that chunk. Then, the result of its translation will be the result of translation up to the immediately preceding chunk plus the translated word sequence as the result of translation of that chunk of which chunk-end has been detected.

It should be noted here that while the results of translation of repeatedly translated chunk sequences are fixed as a determinate, a new chunk is not an isolated object of translation. The repeatedly translated chunks are also the object of translation and, therefore, probability distribution of these translated word sequence candidates is repeatedly calculated in the decoder. The chunk sequence as the object of translation becomes longer as the translation is repeated. Therefore, the intermediate language representation of the chunk sequence output by the encoder changes each time. The probability distribution also changes and, therefore, in common translation, probability of each translated word sequence candidate would probably change and the translated word sequence to be selected would also change. In the present embodiment, however, already translated words are treated as determinate in succeeding translations, regardless of the thus calculated probability distribution. This means that in translating a new chunk, the word sequence translated up to that moment would be treated as its context.

2. Configuration of the First Embodiment

(1) Functional Description

Figure 2:
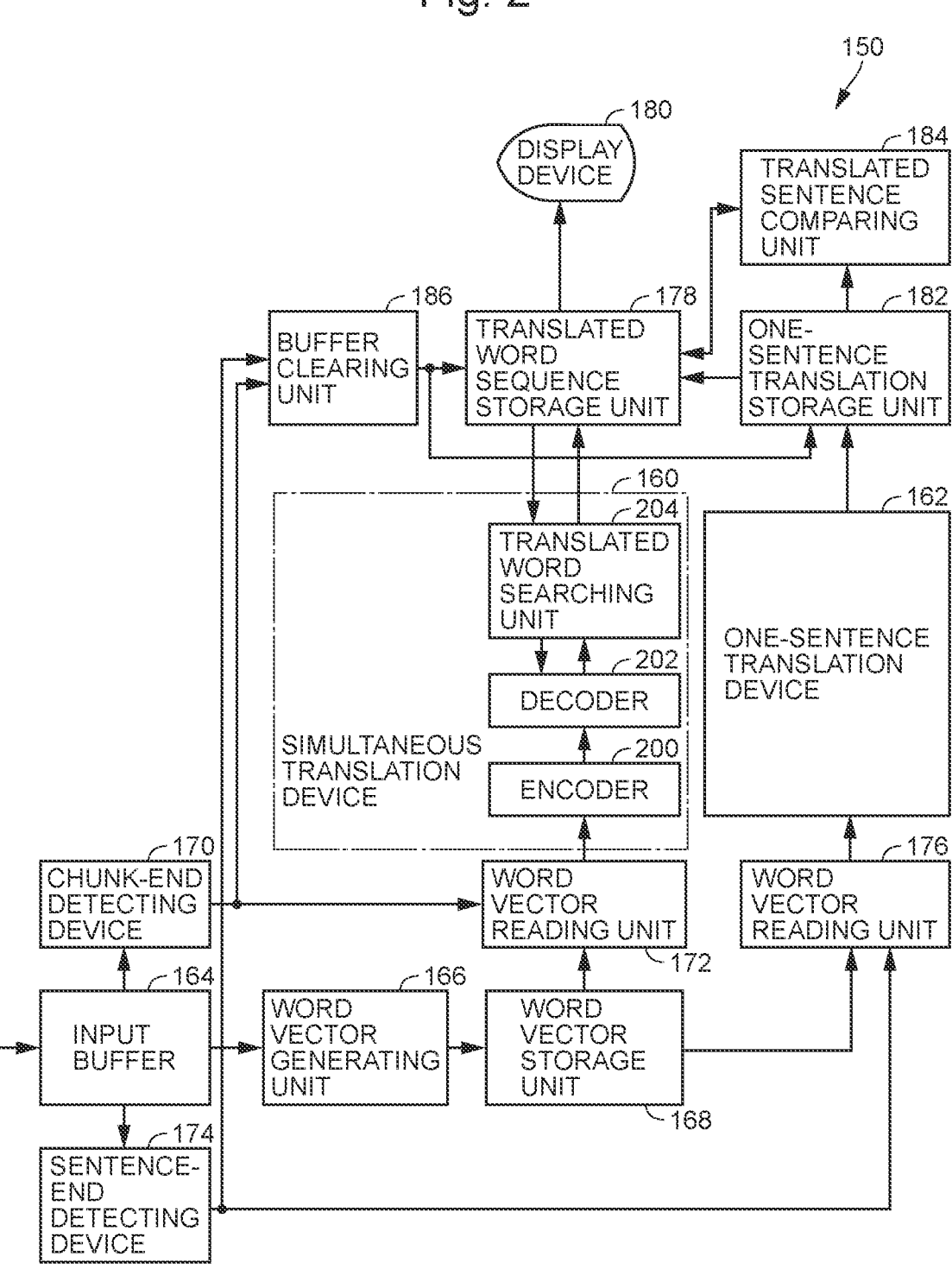
FIG. 2 is a block diagram schematically showing a functional structure of the simultaneous translation device in accordance with the first embodiment of the present invention.

FIG. 2 is a block diagram schematically showing a functional structure of a simultaneous translation system 150 in accordance with the first embodiment of the present invention. Referring to FIG. 2, simultaneous translation system 150 includes: a simultaneous translation device 160 that plays the central role of simultaneous translation, for successively translating, every time a new chunk is received, the chunk sequence that has been input up to that time substantially on a real time basis; and a one-sentence translation device 162 for machine-translating, when a word sequence reaches an end of sentence, the word sequence input up to that time as one sentence. In the present embodiment, as the one-sentence translation device 162, a conventional machine translation device is used. As simultaneous translation device 160, an encoder-decoder type machine translation device basically similar to the one described in Non-Patent Literature 2 is used, as will be described later. It is noted, however, that the simultaneous translation device 160 is slightly different from the conventional machine translation device in the method of searching a translated word sequence. This is not a major difference and, as described above, it differs only in that the word sequence already translated so far is treated as a determinate, fixed context. The method of searching a translated word itself is the same.

Simultaneous translation system 150 further includes: an input buffer 164 for receiving and storing word sequences from a voice recognition device, not shown; a word vector generating unit 166 for successively converting each word of the word sequence stored in input buffer 164 to a word-embedding vector; and a word vector storage unit 168 for successively storing the word embedding vectors from the first in order of generation by word vector generating unit 166. Simultaneous translation system 150 further includes: a chunk-end detecting device 170 for detecting a new chunk-end of the word sequence stored in input buffer 164 and outputting a chunk-end detection signal; and a sentence-end detecting device 174 for detecting an end of sentence of the word sequence stored in input buffer 164 and outputting a sentence-end detection signal.

In the present embodiment, chunk-end detecting device 170 and sentence-end detecting device 174 are both realized by a neural network trained using the same technique as described in Non-Patent Literature 1. More specifically, a neural network trained by using word sequences in which a word to be a chunk-end has a label indicating chunk-end added as teacher data is used for chunk-end detecting device 170. A neural network trained by using word sequences in which a word to be an end of sentence has a label indicating sentence-end added as teacher data is used for sentence-end detecting device 174.

Simultaneous translation system 150 further includes: a word vector reading unit 172, responsive to reception of a chunk-end detection signal from chunk-end detecting device 170, for reading a word vector sequence stored in word vector storage unit 168, and inputting it to simultaneous translation device 160 to start translation; and a word vector reading unit 176, responsive to the sentence-end detection signal from sentence-end detecting device 174, for reading a word vector sequence stored in word vector storage unit 168 and inputting it to one-sentence translation device 162 to start translation.

Simultaneous translation system 150 further includes: a translated word sequence storage unit 178 for storing a translated word sequence in a target language output from simultaneous translation device 160; a display device 180 for displaying the translated word sequence stored in translated word sequence storage unit 178; and a one-sentence translation storage unit 182 for storing a translated word sequence of one sentence output from one-sentence translation device 162. Simultaneous translation system 150 further includes: a translated sentence comparing unit 184, responsive to a new translated word sequence stored in one-sentence translation storage unit 182, for comparing a translated word sequence stored in translated word sequence storage unit 178 with the translated word sequence stored in one-sentence translation storage unit 182, and if the difference is of a prescribed magnitude or larger, replacing the translated word sequence stored in translated word sequence storage unit 178 with the translated word sequence stored in one-sentence translation storage unit 182; and a buffer clearing unit 186 responsive to reception of a first chunk-end detection signal from chunk-end detecting device 170 after receiving a sentence-end signal from sentence-end detecting device 174, for clearing the translated word sequence storage unit 178. Here, the difference between the translated word sequences can be determined, for example, by character N-gram difference between the word sequence stored in translated word sequence storage unit 178 and the one-sentence translation result stored in one-sentence translation storage unit 182.

Simultaneous translation device 160 includes: an encoder 200 implemented by a neural network pre-trained to receive as an input a word vector sequence read from word vector reading unit 172 and to output a vector that is an intermediate language representation corresponding to the content represented by the input; and a decoder 202 implemented by a neural network pre-trained to receive as an input a word vector of a translation target language and to output probability distribution of a word to appear following the word represented by the word vector. Simultaneous translation device 160 further includes: a translated word searching unit 204 searching for a word sequence in the translation target language having the highest probability, by repeating a process of: applying a vector from encoder 200, which is an intermediate representation, to decoder 202 as a first input; predicting the next word based on the probability distribution output by decoder 202; and further applying it to decoder 202. Decoder 202 and translated word searching unit 204 receive the intermediate language representation output from encoder 200 as an input, and regarding the translation word sequence that has already been translated as determinate, search for a translation word sequence to follow, thereby successively output a translation word sequence corresponding to the input word sequence.

The word probability distribution here refers to a vector having as elements probability of each word appearing next to the word sequence input so far to decoder 202, for each of a prescribed number of words selected as vocabulary (lexicon) of translation target language (hereinafter simply referred to as "lexicon of translation target language"). Therefore, decoder 202 has outputs that are the same in number as the number of words in the lexicon selected as the object of translation in the translation target language, which are obtained as a result of softmax operation in the output layer of translated word searching unit 204. Further, the next word candidate predicted by translated word searching unit 204 is given as an input to decoder 202. Therefore, decoder 202 has the same number of inputs as the number of elements of the word vector. Therefore, the intermediate representation vector output from encoder 200 also has the same form as the word vector. It is noted, however, that encoder 200 must have inputs of at least the same number as the maximum number of word vectors stored in word vector storage unit 168. In the present embodiment, encoder 200 has a configuration that allows input of at most 300 words. At the end of an input word sequence, a prescribed sentence-end token is added and, therefore, 299 is the upper limit of the number of words that can be input. If the length of an input word sequence is shorter than 300 words, a prescribed padding character sequence is input following the word sequence.

(2) Control Structure of the Program
(A) Overall Structure

Figure 3:
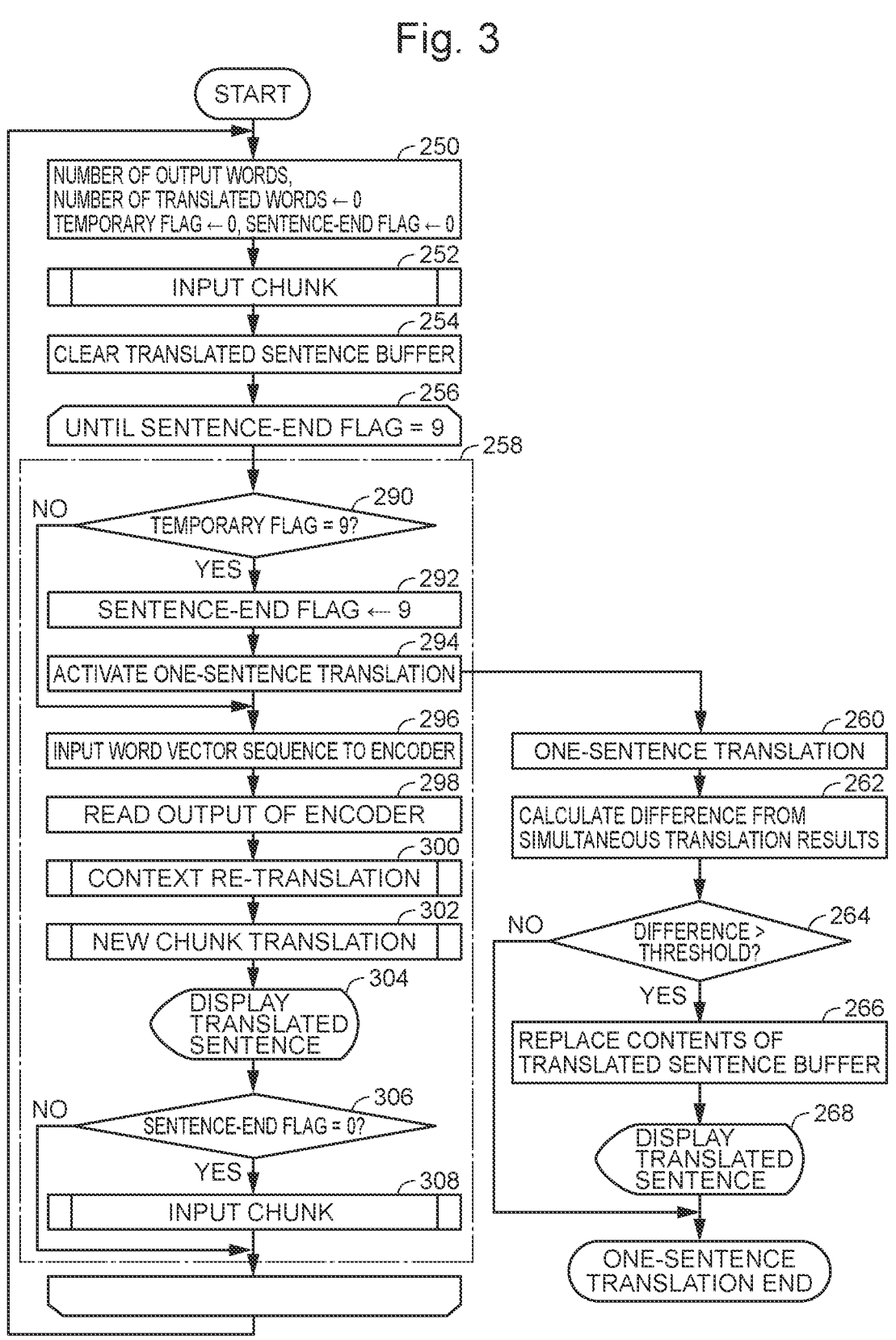
FIG. 3 is a flowchart showing a control structure of a program causing a computer to function as the simultaneous translation device in accordance with the first embodiment.

FIG. 3 is a flowchart showing a control structure of a program as a whole to cause a computer to function as the simultaneous translation system 150 shown in FIG. 2. Referring to FIG. 3, the program includes a step 250 for executing an initializing process for executing the program. At step 250, 0 is respectively input to a variable $N_O$ representing the number of already outputted words and a variable $N_T$ representing the number of already translated words. Further, at step 250, a value "0" representing no-end-of-sentence is input both to a temporary flag temporarily indicating whether or not a word sequence stored in input buffer 164 shown in FIG. 2 has reached the end of sentence, and to a sentence-end flag indicating that the end of sentence is reached and confirmed. When the end of sentence is detected, 9 is temporarily input to the temporary flag, and when the end of sentence is confirmed, 9 is input to the sentence-end flag.

The program further includes: a step 254 of clearing the translated word sequence storage unit 178 shown in FIG. 2 (corresponding to the buffer clearing unit 186 of FIGS. 2 and 8); and a step 256 of repeating the following step 258 until the value of sentence-end flag becomes 9, that is, until the end of sentence is detected and confirmed. When the process of step 256 ends, or when the process to the end of a sentence is completed, the control returns to step 250. This program itself does not have a function of ending execution. When the operating system receives any signal to end this program from a user, a specific system or the like, the operating system ends execution of this program.

If an end of sentence is detected during execution of step 256, a one-sentence translation process of steps 260 to 268 is executed, the contents of which will be described later.

(B) Chunk Input Process

Figure 8:
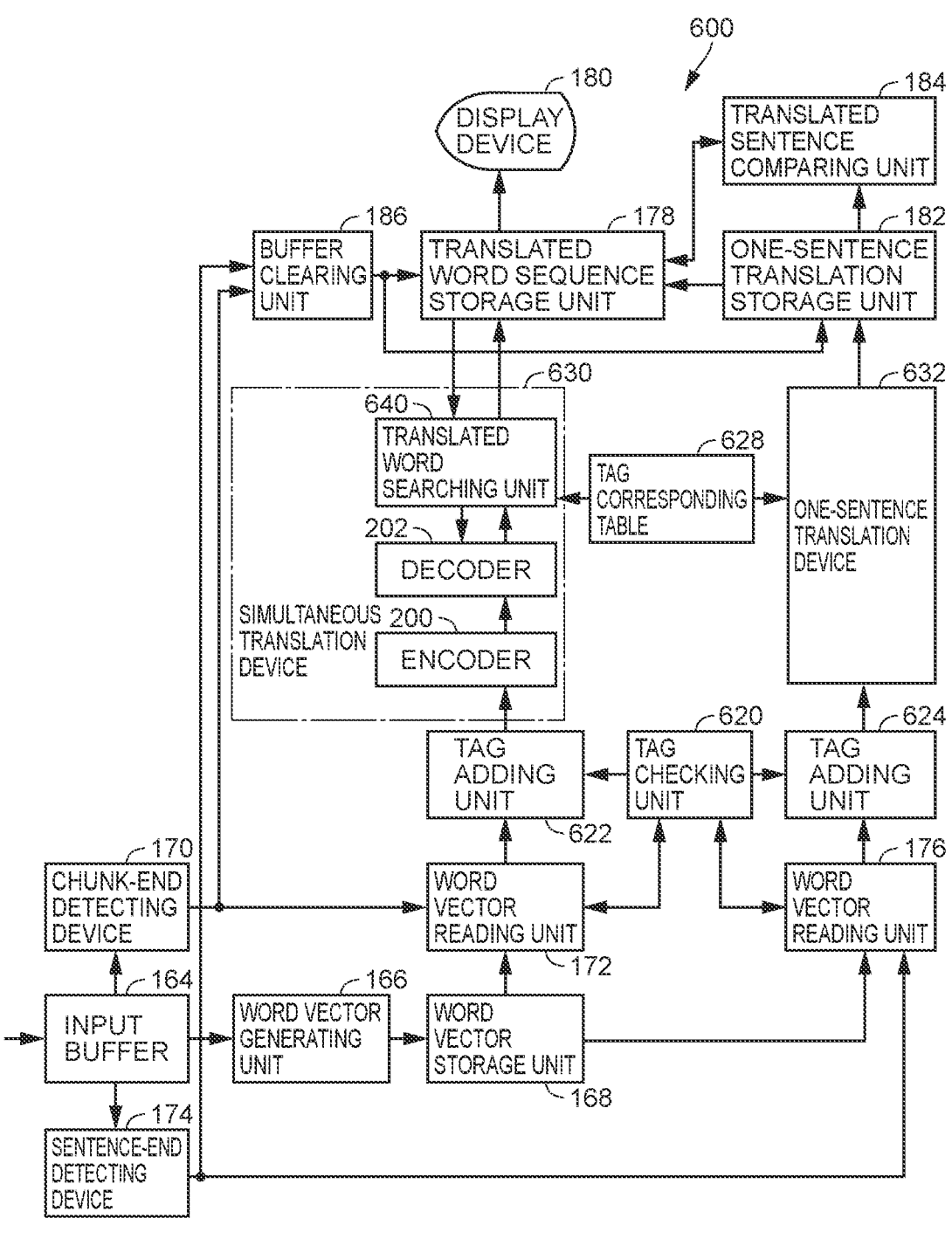
FIG. 8 is a block diagram schematically showing a functional structure of the simultaneous translation device in accordance with the second embodiment.

Referring to FIG. 4, the chunk input process shown by step 252 of FIG. 3 (same as step 308) includes: a step 350 of reading word sequences stored in input buffer 164 of FIG. 2; and a step 352 of converting words in the read word sequence to word embedding vectors to provide word vectors, and adding these to the tail of the word vector sequence stored in word vector reading unit 172 (corresponding to word vector generating unit 166 of FIGS. 2 and 8). The chunk input process further includes a step 356 of determining whether or not a chunk-end detection signal indicating detection of an end of chunk is received from chunk-end detecting device 170 shown in FIG. 2 and branching the control flow depending on the result of determination. The end of sentence is also a type of chunk-end and, therefore, chunk-end detecting device 170 outputs a chunk-end detection signal at the end of a sentence, in addition to chunks not at the end of a sentence.

The program further includes: a step 358 responsive to a positive determination at step 356, of further determining whether or not an end of sentence is detected, based on the sentence-end detection signal from sentence-end detecting device 174, and branching the control flow depending on the result of determination; and a step 360, responsive to a negative determination at step 358, of inputting 0 to the temporary flag. The program further includes: a step 362, responsive to a positive determination at step 358, of inputting 9 to the temporary flag; and a step 364, following step 360 and step 362, of adding a prescribed sentence-end token to the tail of the word sequence stored in word vector storage unit 168 shown in FIG. 2 and ending the chunk input process (corresponding to the word vector reading unit 172 of FIGS. 2 and 8). If the determination at step 356 is in the negative, the control returns to step 350.

It is noted that while 9 is input to temporary flag at step 362, the process on the word sequence stored in word vector storage unit 168 is not yet executed. Therefore, the value of the temporary flag is considered to be a value indicating a tentative end-of-sentence. The sentence-end token indicates an end of input, as in the conventional neural machine translation. It follows that, at the time of translation, translation of the input is completed when a prescribed token corresponding to the sentence-end token is output from the decoder.

(C) Step 258

Returning to FIG. 3, step 258 includes: a step 290 of determining whether or not the value of temporary flag is 9 and branching the control flow depending on the result of determination; and a step 292 of inputting 9 to the sentence end flag when the determination at step 290 is in the positive. Step 258 further includes: a step 294 of activating the one-sentence translation process described above as a process separate from the process of this program; and a step 296, executed when the determination at step 290 is in the negative, or when the determination at step 290 is in the positive and execution of steps 292 and 294 ends, of inputting the word vector sequence stored in word vector reading unit 172 shown in FIG. 2 to encoder 200. Step 258 further includes: a step 298 of reading vectors as the intermediate language representation corresponding to the word vector sequence output, in response to this input, from encoder 200, and successively inputting the same to decoder 202.

The program further includes: a step 300 of re-translating the already translated word sequence stored in translated word sequence storage unit 178 shown in FIG. 2 to a context for the word sequence of following chunks, through cooperation of decoder 202 and translated word searching unit 204; and a step 302, responsive to the end of re-translation of the already translated word sequence at step 300, of translating a word sequence included in a not-yet-translated chunk through cooperation of decoder 202 and translated word searching unit 204 shown in FIG. 2, and adding the thus translated words to the tail of already translated word sequence stored in translated word sequence storage unit 178.

This program further includes: a step 304, responsive to the end of translation at step 302, of displaying, on a display screen of display device 180 shown in FIG. 2, a translated word sequence consisting of the words in the translation target language stored in translated word sequence storage unit 178; and a step 306 of branching the control flow depending on whether the value of sentence-end flag is 0 or not. The program further includes: a step 308, responsive to the positive determination at step 306, of executing the chunk input process, which is the same as the process of step 252 and ending execution of step 258. If the determination at step 306 is in the negative, execution of step 258 ends immediately.

(D) Context Re-Translation Process

Details of step 300 of FIG. 3 will be described with reference to FIG. 5. Referring to FIG. 5, step 300 includes: a step 400 of inputting 0 to variable $N_0$ representing the number of words already output by the present translation; and a step 402 of repeating the following step 404 until the value of variable $N_0$ becomes equal to the variable $N_T$ representing the number of words translated and confirmed thus far.

Step 404 includes: a step 420 of reading the probability distribution output from decoder 202 shown in FIG. 2; a step 422 of selecting $N_0$-th translated word stored in translated word sequence storage unit 178 as the next word in accordance with the probability distribution; a step 424 of inputting the word selected at step 422 to decoder 202; and a step 426 of adding 1 to the value of variable $N_0$ and ending execution of step 404.

Specifically, while a prescribed number of translated word candidates having highest probabilities would be selected from the outputs of decoder 202 in the typical process, in the context re-translation process, only the translated words stored in translated word sequence storage unit 178 are adopted and searching of translated word candidates does not take place.

(E) New Chunk Translation Process

Details of step 302 of FIG. 3 will be described with reference to FIG. 6. Referring to FIG. 6, step 302 includes: a step 450 of reading the probability distribution output from decoder 202; and a step 452 of searching translation word sequences corresponding to an input chunk, using a word sequence, which is obtained by concatenating the already translated word sequence stored in translated word sequence storage unit 178 and a prescribed number of (here, 5) translated word candidates having highest probabilities, as a starting point. Step 302 further includes a step 454 of adding a new word sequence (corresponding to a new chunk) following the already translated words, obtained as a result of search at step 452, to the tail of the already translated words; and a step 456 of adding the number of newly added translated words added at step 454 to variable $N_T$ and ending the process.

In the process of step 452, a large number of translated word sequence candidates can be obtained during the course of search. Therefore, it is preferable to trim, based on the probability of each word sequence, to reduce the processing time.

(F) Program for One-Sentence Translation

On the other hand, the program executed for the process of one-sentence translation activated at step 294 of FIG. 3 has the following control structure. Referring to FIG. 3, specifically, the program includes: a step 260 of executing the one-sentence translation process; and a step 262 of comparing the translated sentence obtained at step 260 with the translated sentence obtained for the word sequence to the end of sentence by the process of step 258 and calculating difference therebetween. The program further includes: a step of branching the control flow depending on whether the difference calculated at step 262 is larger than a prescribed threshold or not; and a step 266, responsive to a positive determination at step 264, of replacing the word sequence as a result of simultaneous translation stored in translated word sequence storage unit 178 shown in FIG. 2 with the translated sentence obtained by the process of step 260. The program further includes a step 268, responsive to the replacement of the word sequence stored in translated word sequence storage unit 178, of updating the display on display device 180 and ending the one-sentence translation process. If the determination at step 264 is in the negative, the display on display device 180 is not updated, and the one-sentence translation process ends.

3. Operation of the First Embodiment

The simultaneous translation system 150 having the above-described structure operates in the following manner.

(1) Start of Translation

Referring to FIGS. 1(A) and 2, when simultaneous translation starts, words w1, w2 and w3 forming a chunk 60 are stored in this order in input buffer 164. At the start of simultaneous translation process, input buffer 164 is empty. Chunk-end detecting device 170 detects an end of chunk as the word w3 is input, and transmits a chunk-end detection signal to word vector reading unit 172. Here, word w3 is not an end of a sentence. Therefore, sentence-end detecting device 174 does not output any sentence-end detection signal.

The process thus far is realized by steps 250 and 252 shown in FIG. 3 (details are shown as chunk input process in FIG. 4). Referring to FIG. 3, a computer executes the initialization process at step 250. Further, referring to FIG. 4, in response to storage of a new word (word w1) in input buffer 164, the computer reads the word w1 (step 350). The computer turns the word w1 to a vector and stores it in word vector storage unit 168 (step 352). Thereafter, at step 356, whether or not a chunk-end is detected is determined. This determination is in the negative for the first word w1. Therefore, the control returns to step 350.

As a result, a word vector corresponding to the first word w1 is stored in word vector storage unit 168. The translated word sequence storage unit 178 remains empty.

For the word w2, the same process as for w1 is executed. Thus, it follows that a word vector sequence corresponding to the word sequence w1, w2 comes to be stored in word vector storage unit 168.

For word w3, the same process as for words w1 and w2 is executed until step 352 of FIG. 4. As a result, a word vector sequence corresponding to the word sequence w1, w2 and w3 is stored in word vector storage unit 168 at the end of step 352.

At word w3, a chunk-end is detected. Therefore, the control proceeds from step 356 to step 358. Since word w3 is not an end of a sentence, control proceeds from step 358 to step 360. At step 360, 0 is input to the temporary flag. In other words, this temporary flag indicates that it is not the end of a sentence.

Then, at step 364, a sentence-end token is added to the tail of the word vector sequence stored in word vector storage unit 168 shown in FIG. 2, and the steps for the first chunk end.

(2) Translation of the First Chunk

Returning to FIG. 3, when the first chunk is translated, at the start of step 256, the sentence-end flag is 0. Therefore, step 258 is executed. Step 258 is executed chunk by chunk.

For this chunk, temporary flag is 0. Therefore, the determination at step 290 is in the negative. Thus, control proceeds to step 296. At step 296, word vector reading unit 172 shown in FIG. 2 reads the word vector sequence stored in word vector storage unit 168, adds a sentence-end token to the tail and inputs the result to encoder 200. Encoder 200 converts the word vector sequence to a vector of intermediate language representation and outputs.

Returning to FIG. 3, at step 298, the vector output from encoder 200 is input to decoder 202, and then, step 300 is executed.

Referring to FIG. 5, at step 400 as the first step of the process of step 300, 0 is input to variable $N_O$. Thereafter, until the value of variable $N_O$ becomes equal to variable $N_T$ at step 402, the process of step 404 is repeatedly executed.

Here, the variable $N_O$ represents the number of translated words output by the process of step 404. Variable $N_T$ represents the total number of translated words translated from the preceding chunks. Therefore, in the process for the first chunk, the variable $N_T$ is 0. Specifically, here, variables $N_O$ and $N_T$ are both 0 and equal. Thus, step 404 is not executed at all, and step 300 ends.

Returning to FIG. 3, following step 300, step 302 is executed. Referring to FIG. 6, at step 450 of the process of step 302, the vector output from decoder 202 shown in FIG. 2 is read. The vector represents probability distribution related to the translated word candidates. Specifically, it has the elements same in number as the number of words included in the lexicon of translation target language, and each element represents the probability that it is the translated word corresponding to the word in the translation source language input to decoder 202. Here, the internal state of decoder 202 varies depending on the translation by that time and, therefore, the probability is not simply determined by the combination of the words in the translation source language and translated words.

At step 452, each of the translated words following the tail of the word sequence already translated and stored in translated word sequence storage unit 178 shown in FIG. 2 is input to decoder 202 and highest ranking 5 candidates of the next word sequence are determined. These translated word candidates are the highest ranking five vectors of the vectors read at step 450. For the obtained words, similar process is continued. This process is repeated until decoder 202 outputs a sentence-end token, until the probability of translation word sequence attains to be lower than a threshold value, or until the probability of translation word sequence goes out of highest five, to search for the translation word sequence. When the search at step 452 ends, the control proceeds to step 454.

At step 454, that word sequence which had the highest probability among the searched translation word sequences is selected as the translated word sequence for the input chunk. Specifically, such a word sequence is added to the tail of the translated word sequence stored in the translated word sequence storage unit 178 shown in FIG. 2. Since the translated word sequence storage unit 178 is empty when the first chunk is processed, here, the selected translated word sequence is stored at the head of translated word sequence storage unit 178.

At the following step 456, 1 is added to the value of variable $N_T$, and the control returns to step 304 of FIG. 3.

At step 304, the translated word sequence stored in translated word sequence storage unit 178 shown in FIG. 2 is displayed on display device 180.

Thereafter, at step 306, whether or not the value of sentence-end flag is 0 is determined. Here, the value of sentence-end flag is 0 and, therefore, step 308 is executed. Specifically, the step for the second chunk (chunk 64 shown in FIG. 1(B)) is executed. The step 308 is the same process as step 252 shown in FIG. 3.

Referring to FIG. 4, here, the process from step 350 to step 356 is executed, and in word vector storage unit 168 shown in FIG. 2, a word vector consisting of the word vector sequence corresponding to chunk 60 shown in FIG. 1(B) and the word vector sequence corresponding to chunk 64 is stored. The determination at step 358 is in the negative, and 0 is set at the temporary flag at step 360. At step 364, a sentence-end token is added to the tail of the word vector sequence as the object of processing.

At step 296 of FIG. 3, the word vector sequence is input to encoder 200 and encoder 200 outputs its intermediate language representation. The intermediate representation is input to decoder 202 at step 298.

(3) Translation of the Second Chunk

For translating the second chunk, steps 300 and 302 are executed. Referring to FIG. 5, at step 300, the variable $N_T$ at step 402 is 3, in the example shown in FIG. 1. Therefore, step 404 is repeated three times.

In the first execution, at step 420, the probability distribution as the output of decoder 202 is read. At step 422, of the probability distribution, the translated word of the $N_0$-th variable among the translated word sequences stored in translated word sequence storage unit 178 is selected. Since $N_0=0$, the translated word at the head is selected. In this translated word selection, translated sentence search is not executed.

At the following step 424, the selected word (the head translated word of the already translated words) is input to decoder 202. At step 426, 1 is added to the value of variable $N_0$ and the first turn of step 404 ends.

When the variable $N_0$ is 1, at step 404, the same process as described above is executed, the second word stored in translated word sequence storage unit 178 is selected without executing searching of translated sentence, 1 is added to the value of $N_0$ and the second turn of step 404 ends.

The same process is repeated for the third word stored in translated word sequence storage unit 178. As a result, execution of step 300 ends without changing the contents stored in translated word sequence storage unit 178.

For the second chunk, at step 302 shown in FIG. 3, the following process is executed. Referring to FIG. 6, at step 450, the vector output from decoder 202 is read. At step 452, five highest translated word candidates in accordance with the probability distribution represented by the vector are selected, and translation word sequence candidates are searched, using each of these candidates as a starting point. At step 454, from the translation word sequence candidates, the word sequence having the highest probability is selected, and added to the tail of translated word sequence storage unit 178. At step 456, 1 is added to the value of variable $N_T$ and step 302 ends.

During the search for the translation word sequence at step 452, decoder 202 repeatedly outputs the probability distribution. The probability distribution here uses, as a starting point, the internal state of decoder 202 when the probability distribution is calculated at step 300 assuming that the translated word sequence is determinate. Therefore, when the search for translation word sequence for the second chunk is executed independently without executing the process of step 300 at all, the result would not always be the same. Specifically, in the search for the translated words of the second chunk, the translated word sequence for the first chunk stored in translated word sequence storage unit 178 is handled as a context.

(4) Translation of the Third and the Following Chunks

Translation of the third chunk and onward is the same as the translation of the second chunk. It is noted, however, that in translating the third chunk, the translated word sequences determined for the first and second chunks are used as the context, and in translating the fourth chunk, the translated word sequences determined for the first to third chunks are used as the context, and the following process is the same. Specifically, the translated word sequences stored in translated word sequence storage unit 178 are unchanged in these processes and simply a translated word sequence for the new chunk is continuously added at the tail. It is noted that the newly added translated word sequence is not a simple translation of the new chunk, and it is a translated word sequence searched using the translated word sequences stored in translated word sequence storage unit 178 as the context.

(5) Translation of the Last Chunk

Eventually, the control reaches the process of step 258 for the second last chunk. Here, the process of step 258, that is, from step 290 to step 306, is the same as that for the third last chunk. The process of step 308 becomes different.

Referring to FIG. 4, when the chunk following the second last chunk is read, that is, when the last chunk is read, the process of steps 350 to 356 is executed for the last chunk, and thus the last chunk is turned to a vector. Thereafter, the determination at step 358 becomes positive. At step 362, 9 is set at the temporary flag.

As a result, in the process of step 258 for the last chunk, the determination at step 290 becomes positive, and 9 is set at the sentence-end flag at step 292. At step 294, one-sentence translation process is activated. The one-sentence translation process is executed by the one-sentence translation device 162 shown in FIG. 2. The operation of one-sentence translation device 162 will be described later.

Thereafter, the process from step 296 to step 304 shown in FIG. 3 is executed in the similar manner as for the past chunks. For the last chunk, however, the determination at step 306 is in the negative, and therefore, step 308 is not executed, and the control returns to step 250. As a result, initialization process is executed at step 250 and step 252 waits for the next chunk. When the input of next chunk starts, the same process as described above is executed for the new chunk sequence.

(6) One-Sentence Translation Process

As described above, the one-sentence translation process is realized by step 260 activated at step 294. Therefore, step 260 is executed in parallel with the translation process of the last chunk at step 258. In the present embodiment, at step 260, basically, translation is done on the same principle of operation as that of simultaneous translation device 160 shown in FIG. 2. It is different, however, only in that in simultaneous translation device 160, one sentence is divided to a plurality of chunks and chunk translation continues using already translated words as context, while one-sentence translation device 162 translates one whole sentence as one chunk, and that the resulting translation of one-sentence translation is stored only in the one-sentence translation storage unit 182. Therefore, the detailed contents of step 260 will not be repeated here.

At step 262, that is, at the end of one-sentence translation of step 260, difference between the result of simultaneous translation eventually obtained for the whole chunk sequence at step 258 and the result of one-sentence translation obtained at step 260 is calculated. In FIG. 2, this process is executed by translated sentence comparing unit 184. In the present embodiment, the magnitude of this difference is determined by a conventional technique, for example, by the character N-gram difference between the two translated sentences.

At the following step 264, the control flow is branched depending on whether the value of difference calculated at step 262 is larger than a threshold value. Typically, sentence-by-sentence translation is believed to have higher accuracy. Therefore, if the determination at step 264 is in the positive, the content of translated word sequence storage unit 178 shown in FIG. 2 is replaced by the content in one-sentence translation storage unit 182 at step 266, and the content is displayed on display device 180 at step 268. Typically, simultaneous translation by simultaneous translation device 160 ends earlier than the one-sentence translation process. Therefore, if the result of translation obtained by the simultaneous translation is displayed on display device 180 and one-sentence translation ends thereafter, and if the difference between the two translation is larger than the threshold value, the content displayed on display device 180 is replaced by the result of one-sentence translation.

The content displayed on display device 180 is maintained until the step 258 for the head chunk of the next one sentence is executed and the process of step 304 ends. Specifically, no matter whether the result of translation of the input chunk sequence is of simultaneous translation or one-sentence translation, the display is maintained until the translation process at step 258 of the head chunk of the next chunk sequence is substantially completed.

4. Effects of the First Embodiment (1) According to the first embodiment, an input word sequence is divided to chunks, and translation is done chunk by chunk. Further, the translated chunks are regarded as a context and substantial translation is not executed. Therefore, chunk-by-chunk translation can be done in a brief period of time, and translation of word sequences input continuously can be done on a real-time basis. As a result, it becomes possible to provide a simultaneous translation device that can realize substantially real-time translation of input word sequences with high accuracy.

(2) When translation of a preceding chunk sequence ends, the translated word sequence corresponding to the chunk sequence is treated as a context and, except for when replaced with the result of one-sentence translation, it will not be changed by the translation of a succeeding chunk sequence. Therefore, display of the translation word sequence becomes stable, and when, for example, a translation word sequence is displayed as a caption, possible confusion by a user that could be caused by frequent change in order or content of translated word sequences can be reduced.

(3) Generally, it is believed that one-sentence translation has higher accuracy and simultaneous translation does not have an accuracy as high as one-sentence translation since it puts priority on simultaneousness. In the embodiment above, when the difference between the result of one-sentence translation and the result of simultaneous translation is larger than or equal to a threshold value, the result of simultaneous translation is replaced by the result of one-sentence translation. Therefore, even if the result of simultaneous translation is hard to comprehend, easier understanding would be possible by the result of one-sentence translation. Further, such a display is maintained until simultaneous translation process for the first chunk of the next chunk sequence is substantially completed. Thus, it is more likely that the content of an utterance is surely understood.

(4) Further, when the simultaneous translation process for the first chunk of the next chunk sequence substantially ends, the translation result of the immediately preceding sentence is replaced by the result of the simultaneous translation of this chunk. For a user, it is possible to confirm the result of simultaneous translation of a started utterance early, and it is possible to reduce the possibility of confusion caused by a translation result of the immediately preceding utterance kept displayed for a long period even after the start of next utterance.

(5) As the simultaneous translation device 160, any conventional device (such as the one described in Non-Patent Literature 2) of the encoder-decoder structure can be used. Further, there is no decoder-encoder-structure constraint on the one-sentence translation device; therefore, any machine translation device within the above-described constraints may be used for the present embodiment. It is unnecessary to develop any new type of device. Therefore, one that has established evaluation of providing high performance can be used, and thus, a stable simultaneous translation device having high performance can be realized without burden.

5. Modifications

In the above-described first embodiment, the result of interpretation by simultaneous translation is compared with the one-sentence translation at step 264 and the difference between them is calculated. If it is believed that sentence-by-sentence translation generally attains higher accuracy, however, such a comparison may be omitted, and the result of translation by simultaneous interpretation may always be replaced by the result of one-sentence translation and displayed on display device 180 at the end of one-sentence translation. By such an approach also, in most cases, more reliable translation results can be obtained.

II. Second Embodiment

1. Outline of the Translation Method in Accordance with the Second Embodiment In the first embodiment described above, the input word sequences are divided to chunks to be translated chunk by chunk. The input word sequence is not specifically processed. It is noted, however, that information that can be obtained only solely from the input word sequence is limited, as disclosed in Patent Literature 1. For example, it is difficult to draw only from the input word sequence information such as which field of art the input word sequence relates to, who the speaker is that uttered the word sequence, to whom the utterance was made, or in what situation the word sequence was uttered. In case of translation, accuracy of translation can be improved by appropriately selecting corresponding words in accordance with the fields, situations and so on of the utterance.

As a solution to such a problem, Patent Literature 1 discloses adding a specific tag to the head of the input word sequence, in order to enter information exceeding the original sentence to a machine translation device. There is a possibility of further improving the accuracy of simultaneous translation by applying such a technique directly to the first embodiment above.

If the technique disclosed in Patent Literature 1 is directly applied to the first embodiment above, however, the output of the decoder corresponding to the first tag might not be correctly corresponding to the tag, or its position might be changed. Since words already translated serve as context for subsequent chunk processing, it is desirable that the head tag becomes the correct tag also in the translated word sequence and that its position should be at the head of the word sequence.

The second embodiment is devised so that the tag added at the head of the input word sequence is put at the head of the translated word sequence even after simultaneous translation, as the correct tag corresponding to the added tag.

Figure 7:
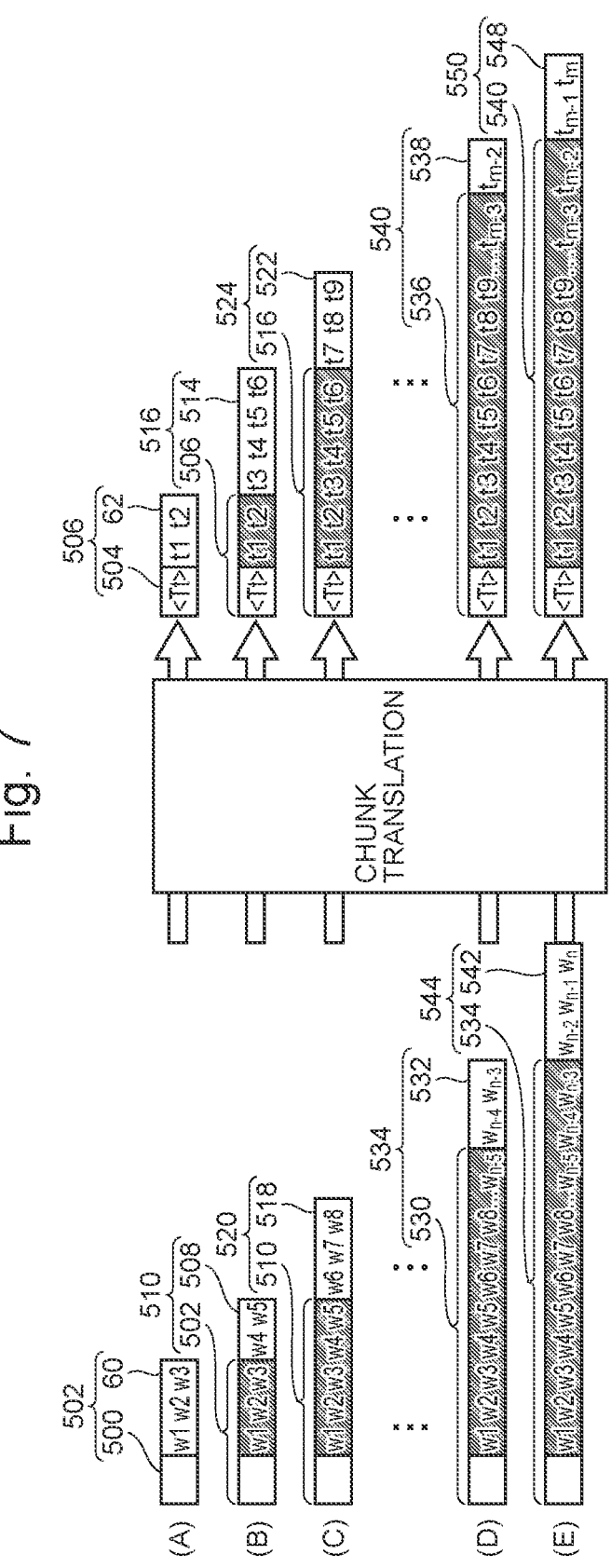
FIG. 7 is an illustration schematically showing a machine translation sequence by the simultaneous translation device in accordance with a second embodiment of the present invention.

Specifically, referring to FIG. 7, by way of example, assume that a chunk 60 is the head chunk of an input word sequence. In the second embodiment, before the start of translation, a tag 500 is added to the head of the head chunk. Specifically, what is input first to the encoder is a chunk sequence 502 consisting of tag 500 and chunk 60. The translated word sequence 506 obtained by translating the chunk sequence 502 consists of a tag 504 and a translation word sequence 62. Tag 504 is the tag of the translation target language corresponding to tag 500, and translation word sequence 62 is a translated word sequence of chunk 60.

Thereafter, the tag 504 always stays at the head of the translated word sequences while the translation continues, and it will not change its position, or be replaced by any other tag or word. Further, the tag 504 is predetermined as one that corresponds to tag 500 and, it will never be replaced by any other tag.

More specifically, referring to FIG. 7(B), the next object of translation is a chunk sequence 510 consisting of the chunk sequence 502 and a second chunk sequence 508. A translated word sequence 516 corresponding to chunk sequence 510 includes translated word sequences 506 and 514. Referring to FIG. 7(C), the third object of translation is a chunk sequence 520 consisting of the chunk sequence 510 and the third chunk 518. A translated word sequence 524 corresponding to chunk sequence 520 includes translated word sequences 516 and 522.

Referring to FIG. 7(D), assume that after such a process, the second-to-last object of translation is a chunk sequence 534 including chunk sequences 530 and 532. The chunk sequence 534 is the chunk that was the third-to-last object of translation. The translated word sequence 540 as the result of translation corresponding to chunk sequence 534 includes translated word sequences 536 and 538. The translated word sequence 536 is the translated word sequence of the chunk sequence 530 that was the third to last object of translation. Referring to FIG. 7(E), a chunk sequence 544 that is the last object of translation includes the chunk sequence 534, which was the second-to-last object of translation, and the last chunk 542. The translated word sequence 550 as the result of translation of chunk sequence 544 includes the translated word sequence 540 as the second-to-last translation result and a translated word sequence 548 as the result of translation of chunk 542.

From this FIG. 7, it can be seen that tag 500, which was at the head of the input word sequence, always exists as tag 504 at the head of the translated word sequences.

2. Configuration of the Second Embodiment

FIG. 8 shows, in a schematic block diagram, a functional configuration of simultaneous translation system 600 in accordance with the second embodiment. The simultaneous translation system 600 is different from the simultaneous translation system 150 shown in FIG. 2 in the following:

In place of simultaneous translation device 160 of FIG. 2, it includes a simultaneous translation device 630 performing simultaneous translation while adding a tag corresponding to the head tag to the head of a translated word sequence as described above;

In place of one-sentence translation device 162 of FIG. 2, it includes a one-sentence translation device 632 performing one-sentence translation of an input word sequence having a tag added to the head;

It includes a tag checking unit 620, which checks the head chunk sequence of a word sequence read from word vector storage unit 168 by word vector reading units 172 and 176, doing nothing if a tag has been added at the head, and if not, selecting a prescribed tag in accordance with information given by a user in advance, or in accordance with information given, for example, from a speech recognition device that transmits word sequences to input buffer 164, and outputting the tag;

It includes a tag adding unit 622 provided between word vector reading unit 172 and simultaneous translation device 630, for adding the tag output from tag checking unit 620 to the head of the chunk sequence read by word vector reading unit 172 from word vector storage unit 168, and inputting the result to encoder 200;

It includes a tag adding unit 624 provided between word vector reading unit 176 and one-sentence translation device 632, for adding the tag output from tag checking unit 620 to the head of the chunk sequence read by word vector reading unit 176 from word vector storage unit 168, and inputting the result to one-sentence translation device 632; and It includes a tag correspondence table 628 connected to simultaneous translation device 630 and one-sentence translation device 632, storing, in the form of a table, correspondence between the translation source tags and translation target tags.

If tag checking unit 620 does not output any tag, tag adding units 622 and 624 provide the outputs from word vector reading units 172 and 176 as they are, to simultaneous translation device 630 and one-sentence translation device 632. This is the case where a tag has been already added at the head of the input word sequence.

Simultaneous translation device 630 includes, in place of translated word searching unit 204 of simultaneous translation device 160 shown in FIG. 2, a translated word searching unit 640 having a function of looking up a tag in the target language corresponding to the tag of the translation source language added to the head chunk from the tag correspondence table 628, inserting the tag in the translation target language at the head of the translated word sequence, and storing it at the head of the translated word sequence storage unit 178, before starting translated word search on the head chunk, which search is done in the similar manner as translated word searching unit 204. In other respects, simultaneous translation device 630 is the same as simultaneous translation device 160 shown in FIG. 2.

One-sentence translation device 632 is like the simultaneous translation device 630 in that, different from one-sentence translation device 162 shown in FIG. 2, one-sentence translation device 632 has a function of looking up a tag in the target language corresponding to the tag of the translation source language added to the head chunk from the tag correspondence table 628, inserting the tag at the head of the translated word sequence, and storing it at the head of the one-sentence translation storage unit 182. In other respects, one-sentence translation device 632 is the same as one-sentence translation device 162.

While configurations of simultaneous translation device 630 and one-sentence translation device 632 are the same as those of simultaneous translation device 160 and one-sentence translation device 162, respectively, shown in FIG. 2, it is noted that training data for training these are different. For training these devices, translation pairs consisting of sentences in the source language and corresponding sentences in the target language are used. Here, no tag is added to the head of any input translation pair at the time of training simultaneous translation device 160 and one-sentence translation device 162. For training the simultaneous translation device 630 and one-sentence translation device 632, however, it is necessary to add corresponding tags to the head of the sentence in translation source language and the sentence in translation target language of each translation pair of the input training data. The manner of training itself is the same in the first and second embodiments.

Figure 9:
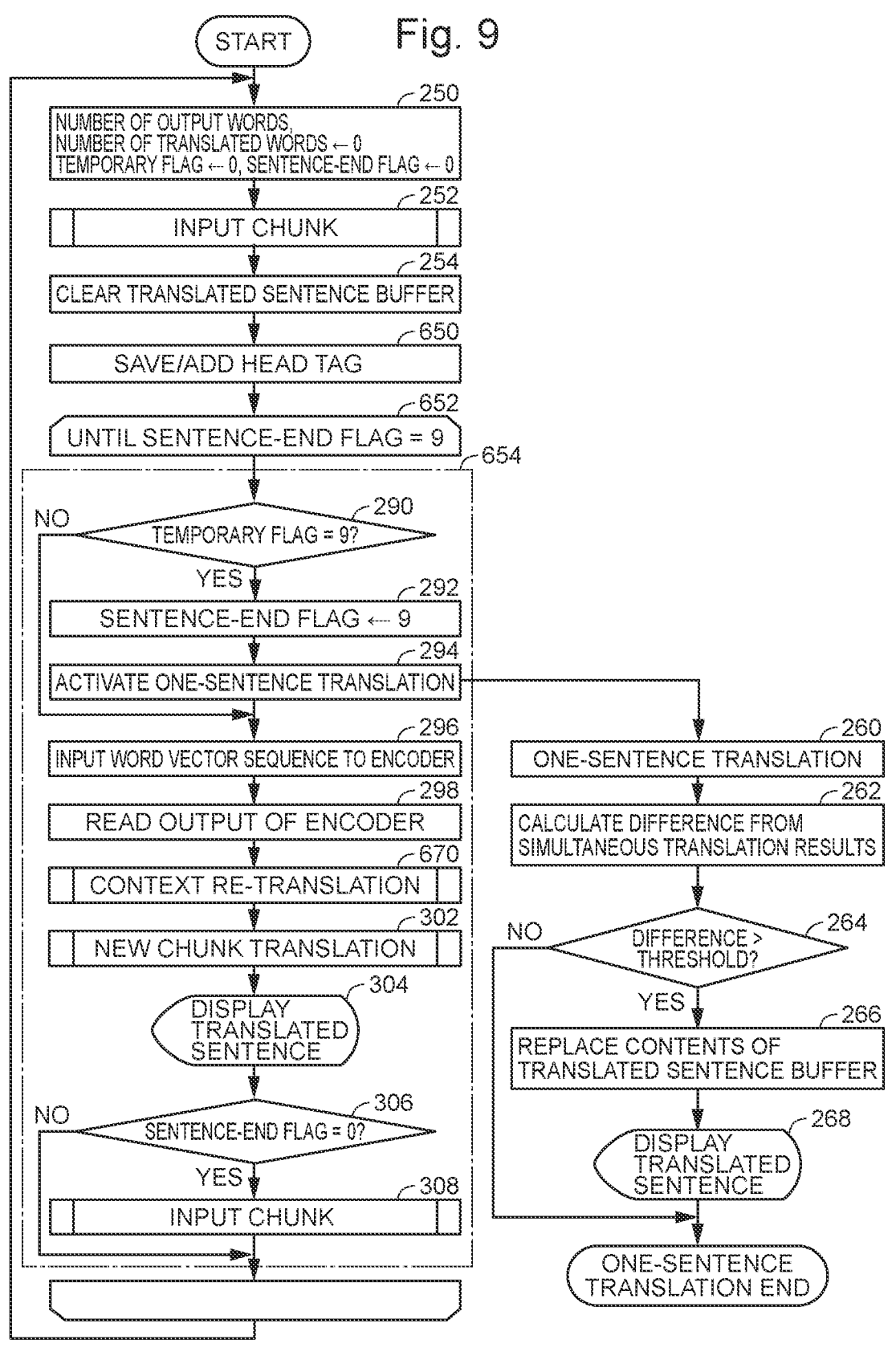
FIG. 9 is a flowchart showing a control structure of a program causing a computer to function as the simultaneous translation device in accordance with the second embodiment.

FIG. 9 shows, in the form of a flowchart, a control structure of a program causing a computer to function as the simultaneous translation system 600 in accordance with the second embodiment. The flowchart of FIG. 9 differs from that of FIG. 3 in the following:

Between steps 254 and 256, it includes a step 650 of determining whether or not a tag is added to the head of an input chunk, and if a tag is added. storing the tag, and if not, selecting a prescribed tag in accordance with information given in advance from the user or in accordance with information given from the speech recognition device, and adding the tag to the head of word vector sequence of the head chunk; and in place of step 256 of FIG. 2, it includes a step 652 of repeating the step 654, which will be described in the following.

While step 654 is like step 258 of FIG. 2, it is different from step 258 in that step 654 includes, in place of step 300, a step 670, which is like step 300 but executes a special process related to the tag at the head for the head chunk sequence, different from step 300.

Figure 10:
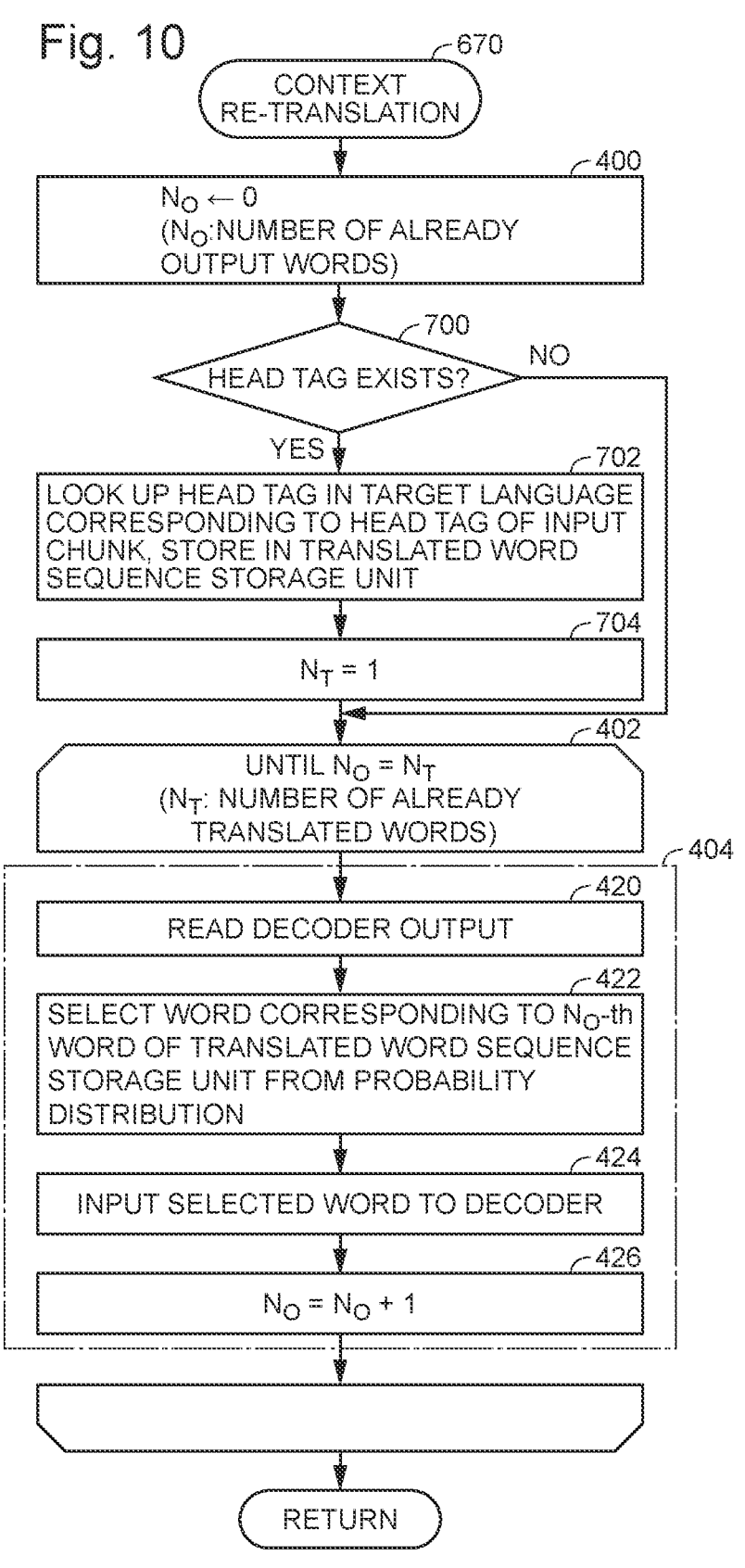
FIG. 10 is a flowchart showing a control structure related to details of a translated chunk re-translation process of the program shown in FIG. 9.

FIG. 10 shows a control structure of a program causing a computer to execute step 670. The program for the steps shown in FIG. 10 differs from step 300 in the following points. It includes, between steps 400 and 402 of FIG. 3, a step 700 of determining whether or not a tag exists at the chunk head, and branching the control flow depending on the result;

It includes a step 702, executed in response to the positive determination at step 700, of looking up a tag in the translation target language corresponding to the head tag of the input chunk from tag correspondence table 628 shown in FIG. 8 and storing it in the head of one-sentence translation storage unit 182 shown in FIG. 8, and thereby inserting the tag in the translation target language at the head of the translation word sequence; and Following step 702, it includes a step 704 of inputting 1 to variable $N_T$.

If the determination at step 700 is in the negative, the flow branches to step 402.

3. Operation of the Second Embodiment

The operation of simultaneous translation system 600 is the same as the first embodiment except for the operation on the first chunk of the word sequences input to input buffer 164.

Specifically, when a new word sequence as the object of translation is input to input buffer 164, the process of step 650 is executed on the head chunk. Specifically, if a tag is added to the head of the head chunk, the tag is saved. If there is no tag, a prescribed tag is added to the head of the chunk, in accordance with, for example, information given in advance by the user. Thereafter, step 654 is repeatedly executed until the sentence end flag is set to 9 at step 652, as in the first embodiment.

On the head chunk, however, the process not executed in the first embodiment is executed at step 670 of step 654. Specifically, referring to FIG. 10, here, the determination at step 700 is in the positive and hence, at step 702, a tag corresponding to the head tag in the translation source language added to the head of the input chunk (head chunk) is read from the correspondence table 628 (FIG. 8), and stored at the head of one-sentence translation storage unit 182. Further, at the following step 704, variable $N_T$ is set to 1.

Since the variable $N_T$ is set to 1, the tag stored at the head of one-sentence translation storage unit 182 is treated as context when the head chunk is translated. Therefore, character sequences other than the tag of the head chunk come to be stored successively in the second and following positions of the one-sentence translation storage unit 182. In this point, the operation of simultaneous translation system 600 in accordance with the second embodiment differs from that of the simultaneous translation system 150 in accordance with the first embodiment.

4. Effects of the Second Embodiment

In the second embodiment, different from the first embodiment, by adding a tag at the head of an input word sequence, more accurate translation in accordance with the situation of utterance, such as the specific field, the person who is speaking or spoken to, becomes possible. Particularly, in selecting a translated word, the tag added to the head of the translated words is treated as the context for translated word sequence search and, therefore, the possibility of selecting an appropriate translated word is believed to be higher.

As a result, a simultaneous translation device realizing simultaneous translation of input word sequences on a substantially real-time basis with higher accuracy than the first embodiment can be provided.

III. Computer Implementation

Figure 11:
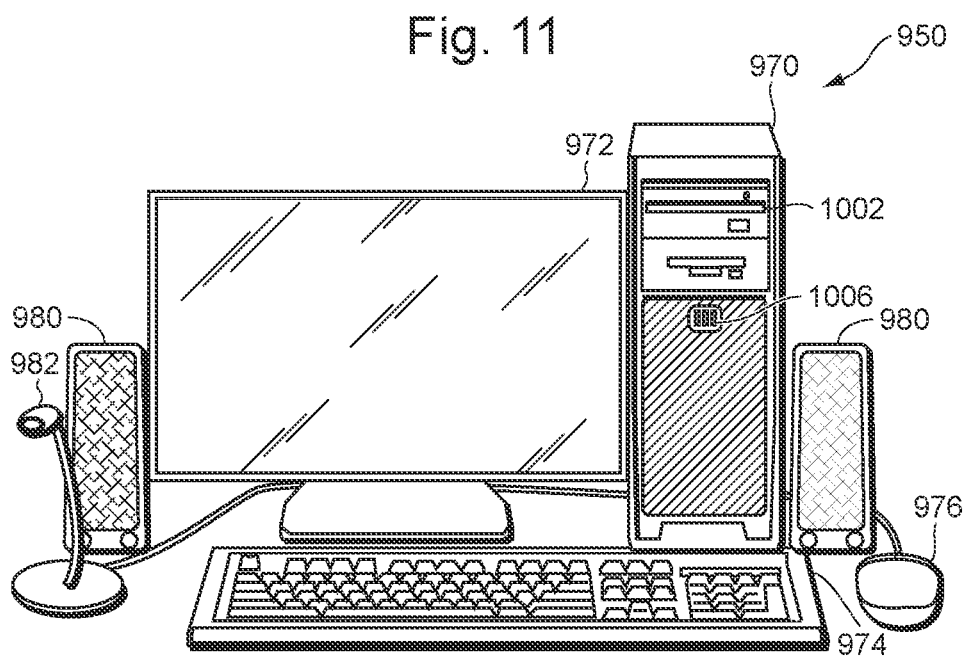
FIG. 11 shows an appearance of a computer system realizing the first and second embodiments.
Figure 12:
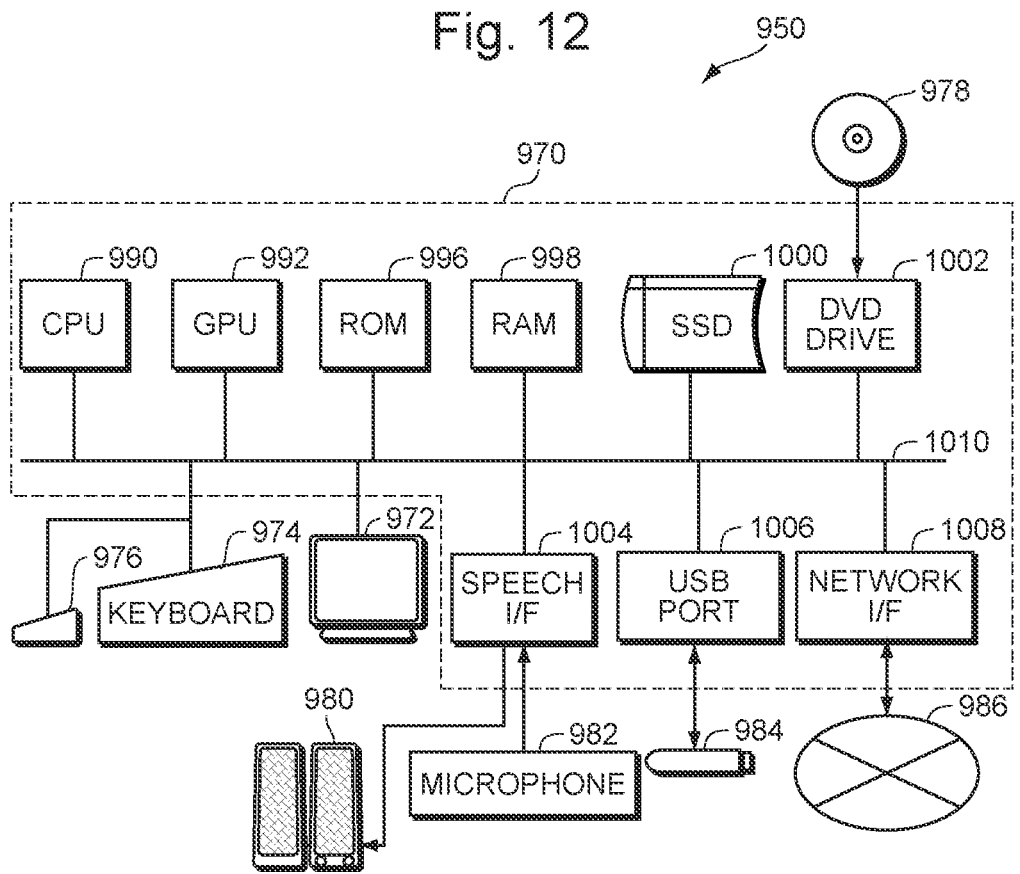
FIG. 12 is a block diagram showing hardware configuration of the computer system shown in FIG. 11.

FIG. 11 shows an appearance of a computer system realizing each of the above-described embodiments. FIG. 12 is a hardware block diagram of the computer system shown in FIG. 11.

Referring to FIG. 11, the computer system 950 includes: a computer 970 having a DVD (Digital Versatile Disc) drive 1002; and a keyboard 974, a mouse 976 and a monitor 972, all connected to computer 970 for interaction with the user. These are examples of equipment for allowing user interaction, and any other general hardware and software (for example, a touch-panel, voice input, pointing device and so on) allowing user interaction may be used.

Referring to FIG. 12, computer 970 includes: in addition to DVD drive 1002, a CPU 990, and a GPU 992. Computer 970 further includes a bus 1010 connected to CPU 990, GPU 992, and DVD drive 1002, and a ROM 996 connected to bus 1010 for storing a boot up programs and the like of computer 970. Computer 970 further includes a RAM 998 connected to bus 1010, for storing program instructions, a system program and work data, and an SSD 1000, which is a non-volatile memory connected to bus 1010. SSD 1000 is for storing programs executed by CPU 990 and GPU 992, data used by the programs executed by CPU 990 and GPU 992 and so on. Computer 970 further includes a network OF 1008 providing connection to a network 986 allowing communication with other terminals; and a USB port 1006 to which a USB memory 984 may be detachably attached, providing communication with USB memory 984 and different units in computer 970.

Computer 970 further includes: a speech OF 1004 connected to a microphone 982, a speaker 980 and bus 1010, reading out a speech signal, a video signal and text data generated by CPU 990 and stored in RAM 998 or SSD 1000 under the control of CPU 990, to convert it into an analog signal, amplify it, and drive speaker 980, or digitizing an analog speech signal from microphone 982 and storing it in addresses in RAM 998 or in SSD 1000 specified by CPU 990.

In the embodiments above, the input word sequences as the object of translation, word vector sequences after conversion of the input word sequences, translated word sequences after translation, data to be displayed on display device 180, parameters and programs realizing simultaneous translation devices 160 and 630 are stored, for example, in SSD 1000, RAM 998, DVD 978 or USB memory 984 shown in FIG. 12, or in a storage medium of an external device, not shown, connected through network OF 1008 and network 986. Typically, the data and parameters are written from the outside to SSD 1000, for example, and at the time of execution by computer 970, loaded into RAM 998.

Computer programs causing the computer system to operate to realize functions of the simultaneous translation system 150 shown in FIG. 2, the simultaneous translation system 600 shown in FIG. 8 and various components thereof are stored in DVD 978 loaded to DVD drive 1002, and transferred from DVD drive 1002 to SSD 1000. Alternatively, USB memory 984 storing the programs is attached to USB port 1006, and the programs may be transferred to SSD 1000. Alternatively, the programs may be transmitted through network 986 to computer 970 and stored in SSD 1000.

At the time of execution, the programs will be loaded into RAM 998. Naturally, source programs may be input using keyboard 974, monitor 972 and mouse 976, and the compiled object programs may be stored in SSD 1000. In that case, both the source program and the object program realize the embodiments. When a script language is used, scripts input through keyboard 974 or the like may be stored in SSD 1000. For a program operating on a virtual machine, it is necessary to install programs that function as a virtual machine in computer 970 beforehand. Since machine translation by simultaneous translation systems 150 and 600 and training of one-sentence translation device 162, simultaneous translation device 630 and one-sentence translation device 632 involves huge amount of computation, it is preferable to realize various components of the embodiments through object program consisting of computer native codes, rather than the script language. From the same reason, it is desirable that the computer is provided with GPU 992 capable of executing a huge number of multiply-accumulate operations at high speed.

CPU 990 fetches an instruction from RAM 998 at an address indicated by a register therein (not shown) referred to as a program counter, interprets the instruction, reads data necessary to execute the instruction from RAM 998, SSD 1000 or from other device in accordance with an address specified by the instruction, and executes a process designated by the instruction. CPU 990 stores the resultant data at an address designated by the program, of RAM 998, SSD 1000, register in CPU 990 and so on. At this time, the value of program counter is also updated by the program. The computer programs may be directly loaded into RAM 998 from DVD 978, USB memory 984 or through the network. Of the programs executed by CPU 990, some tasks (mainly numerical calculation) may be dispatched to GPU 992 by an instruction included in the programs or in accordance with a result of analysis during execution of the instructions by CPU 990.

The programs realizing the functions of various units in accordance with the embodiments above by computer 970 may include a plurality of instructions described and arranged to cause computer 970 to operate to realize these functions. Some of the basic functions necessary to execute the instruction are provided by the operating system (OS) running on computer 970, by third-party programs, or by modules of various tool kits installed in computer 970. Therefore, the programs may not necessarily include all of the functions necessary to realize the system and method in accordance with the present embodiment. The programs have only to include instructions to realize the functions of the above-described various devices or their components by statically linking or dynamically calling appropriate functions or appropriate "program tool kits" in a manner controlled to attain desired results. The operation of computer 970 for this purpose is well known and, therefore, description thereof will not be repeated here.

It is noted that GPU 992 is capable of parallel processing and capable of executing a huge amount of calculation accompanying machine learning simultaneously in parallel or in a pipe-line manner. By way of example, parallel computational element found in the programs during compilation of the programs or parallel computational elements found during execution of the programs may be dispatched as needed from CPU 990 to GPU 992 and executed, and the result is returned to CPU 990 directly or through a prescribed address of RAM 998 and input to a prescribed variable in the program.

IV. Modifications

In the embodiments above, chunk-end detecting device 170 and sentence-end detecting device 174 are separate devices. The present invention, however, is not limited to such an embodiment. By adding label 1 to the word at the chunk-end, label 9 to the word at the sentence-end and label 0 to other words, it becomes possible to train a single neural network that can distinguish chunk-end, sentence-end and others. In that case, chunk-end detecting device 170 and sentence-end detecting device 174 can be integrated.

In the embodiments above, chunk-ends, sentence ends and others are distinguished from each other. The present invention, however, is not limited to these. Translation using a middle of a chunk and one sentence may further be combined, or translation using more than one sentence as an object may further be combined.

Further, in the embodiments above, the technique disclosed in Non-Patent Literature 2 is used both for the simultaneous translation devices 160 and 630. The present invention, however, is not limited to this. Any technique in which an input word sequence is somehow converted to an intermediate language representation and a word sequence for translation is searched from the intermediate language representation, such as the encoder-decoder structure, may be incorporated to the embodiments. Further, one-sentence translation devices 162 and 632 are not necessarily be the same type as the simultaneous translation devices 160 and 630. For example, it may utilize statistical machine translation, machine translation based on phrase translation, or neural machine translation.

Further, in the embodiments, above, translation results are displayed on display device 180. The present invention, however, is not limited to such embodiments. The simultaneous translation device may output the translation results as synthesized speech to a speaker (not shown). Further, if the simultaneous translation device has two types of output devices, the translation results may be output to both of them. For example, if the simultaneous translation device has a display device and a speaker as output devices, the result of simultaneous translation device may be output as synthesized speech through the speaker and the result of one-sentence translation may be displayed on the display device, or vice versa. Further, on the display device, the result of translation by the simultaneous translation device may be displayed first, and then replaced by the result of one-sentence translation, and only the result of one-sentence translation may be output by synthesized speech.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

REFERENCE SIGNS LIST

50 chunk translation
60, 64, 74, 84, 94, 518, 532, 542 chunk
62, 70, 72, 78, 80, 88, 90, 92, 98, 100, 506, 514, 516, 522, 524, 536, 538, 540, 548, 550 translated word sequence
66, 76, 82, 86, 96, 502, 508, 510, 520, 530, 534, 544 chunk sequence
150, 600 simultaneous translation system
160, 630 simultaneous translation device
162, 632 one-sentence translation device
164 input buffer
166 word vector generating unit
168 word vector storage unit
170 chunk-end detecting device

172, 176 word vector reading unit
174 sentence-end detecting device
178 translated word sequence storage unit
180 display device
182 one-sentence translation storage unit
184 translated sentence comparing unit
186 buffer clearing unit
200 encoder
202 decoder
204, 640 translated word searching unit
500, 504 tag
620 tag checking unit
622, 624 tag adding unit
628 tag correspondence table
990 CPU

The invention claimed is:

1. A simultaneous translation device, comprising:
a processor; and
a program memory connected to the processor and configured to store a computer program that, when executed by the processor, causes the processor to perform functions of:
an encoding function for encoding an input word sequence to an intermediate language representation;
a chunk-end detecting function for detecting an end of each chunk in said word sequence on a real-time basis;
a word sequence input function for inputting a partial word sequence to said encoding function each time said chunk-end detecting function detects an end of a chunk, said partial word sequence consisting of a part of said input word sequence from a head of said input word sequence up to the chunk of which end is detected by said chunk-end detecting function;
a decoding function for outputting a translation word sequence of a prescribed language corresponding to said partial word sequence in response to each said intermediate language representation outputted by said word sequence input function; and
a translation word sequence storage function for storing said translation word sequence output from said decoding function; wherein
said decoding function includes a sequential decoding function responsive to said intermediate language representation output from said encoding function for searching for a translation word sequence by following trees of translated word candidate sequences based on a probability distribution which quantifies a likelihood of each word appearing given a preceding word or words, and for sequentially outputting translation word sequences in the prescribed language corresponding to said partial word sequence, wherein
said sequential decoding function selects only those translated word candidate sequences that start with said translation word sequence stored in said translation word sequence storage function, and
wherein said chunk-end detection function is performed by a neural network trained using word vector sequences in which a word designated to be a chunk-end is labeled with a chunk-end label as teacher data.

2. The simultaneous translation device according to claim 1, wherein the processor is further configured to perform functions of:
a sentence-end detecting function for detecting an end of sentence in said input word sequence;
a one-sentence translation function, responsive to detection of the end of sentence by said sentence-end detecting function, for outputting a translated sentence in said prescribed language corresponding to said word sequence up to the end of sentence; and a translation sentence replacing function, responsive to the output of said translated sentence from said one-sentence translation function, for replacing the output of said decoding function by said translated sentence from said one-sentence translation function.

3. The simultaneous translation device according to claim 2, wherein the processor is further configured to perform functions of:

a clearing function, responsive to detection of a chunk-end of said word sequence by said chunk-end detecting function after replacement of said translated sentence by said translation sentence replacing function, for clearing said translation word sequence storage function.

4. The simultaneous translation device according to claim 2, wherein said translation sentence replacing function includes:

an evaluating function, responsive to the output of said translated sentence from said one-sentence translation function, for evaluating magnitude of difference between the output of said decoding function and said translated sentence from said one-sentence translation function; and a replacing function, responsive to an evaluation by said evaluating function that the magnitude of difference is larger than a threshold value, for replacing the output of said decoding function by said translated sentence from said one-sentence translation function.

5. The simultaneous translation device according to claim 1, wherein the processor is further configured to perform functions of:

a tag adding function for adding a first tag determined by a prescribed condition, to a head of the input word sequence;

a tag inserting function for inserting, when said translation word sequence storage function is cleared, by storing a second tag corresponding to said first tag in said translation word sequence storage function, said second tag at the head of said translation word sequence.

* * * * *